(12) United States Patent
Hluchyj et al.

(10) Patent No.: US 8,799,535 B2
(45) Date of Patent: Aug. 5, 2014

(54) STORAGE OF DATA UTILIZING SCHEDULING QUEUE LOCATIONS ASSOCIATED WITH DIFFERENT DATA RATES

(75) Inventors: Michael G. Hluchyj, Wellesley, MA (US); Santosh Krishnan, Wellesley, MA (US); Christopher Lawler, Wellesley, MA (US); Ganesh Pai, Lexington, MA (US); Umamaheswar Reddy, Marlborough, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 326 days.

(21) Appl. No.: 12/013,367

(22) Filed: Jan. 11, 2008

(65) Prior Publication Data

US 2009/0182790 A1   Jul. 16, 2009

(51) Int. Cl.
| | | |
|---|---|---|
| *G06F 3/00* | (2006.01) | |
| *G06F 5/00* | (2006.01) | |
| *H04L 12/28* | (2006.01) | |
| *H04N 7/14* | (2006.01) | |
| *G06F 13/00* | (2006.01) | |

(52) U.S. Cl.
USPC .......... 710/52; 710/2; 710/6; 710/20; 710/21; 710/29; 710/54; 710/56; 370/395.4; 370/395.42; 348/14.12; 711/114; 711/168

(58) Field of Classification Search
USPC ................. 710/52, 5–6, 2, 20–21, 29, 54, 56; 370/395.42, 395.4; 348/14.12; 711/114, 168–170, 201; 709/231; 360/55
See application file for complete search history.

(56) References Cited

U.S. PATENT DOCUMENTS

| 4,092,732 | A | | 5/1978 | Ouchi ........................... 364/900 |
|---|---|---|---|---|
| 5,148,432 | A | | 9/1992 | Gordon et al. ............... 371/10.1 |
| 5,313,585 | A | * | 5/1994 | Jeffries et al. ................. 711/201 |
| 5,412,661 | A | | 5/1995 | Hao et al. |
| 5,473,362 | A | | 12/1995 | Fitzgerald .......................... 348/7 |

(Continued)

FOREIGN PATENT DOCUMENTS

| EP | 0 713 184 | 5/1996 | ............. G06F 17/30 |
|---|---|---|---|
| EP | 0 805 593 | 11/1997 | ............. H04N 7/173 |

(Continued)

OTHER PUBLICATIONS

Carretero et al., "A hierarchical disk scheduler for multimedia systems," Future Gen. Cornp. Sys., vol. 19 (2003), pp. 23-35.*

(Continued)

*Primary Examiner* — Farley Abad
*Assistant Examiner* — Henry Yu
(74) *Attorney, Agent, or Firm* — Joshua T. Matt

(57) ABSTRACT

In one example, multimedia content is requested from a plurality of storage modules. Each storage module retrieves the requested parts, which are typically stored on a plurality of storage devices at each storage module. Each storage module determines independently when to retrieve the requested parts of the data file from storage and transmits those parts from storage to a data queue. Based on a capacity of a delivery module and/or the data rate associated with the request, each storage module transmits the parts of the data file to the delivery module. The delivery module generates a sequenced data segment from the parts of the data file received from the plurality of storage modules and transmits the sequenced data segment to the requester.

20 Claims, 19 Drawing Sheets

(56) References Cited

U.S. PATENT DOCUMENTS

| | | | |
|---|---|---|---|
| 5,530,960 A * | 6/1996 | Parks et al. ..................... 710/5 |
| 5,655,117 A | 8/1997 | Goldberg et al. |
| 5,659,539 A | 8/1997 | Porter et al. |
| 5,805,804 A | 9/1998 | Laursen et al. |
| 5,862,312 A | 1/1999 | Mann et al. ............. 395/182.04 |
| 5,864,682 A | 1/1999 | Porter et al. |
| 5,867,230 A | 2/1999 | Wang et al. |
| 5,878,220 A | 3/1999 | Olkin et al. |
| 5,926,649 A | 7/1999 | Ma et al. ..................... 395/826 |
| 5,982,418 A | 11/1999 | Ely |
| 6,011,798 A * | 1/2000 | McAlpine ................ 370/395.42 |
| 6,070,172 A | 5/2000 | Lowe |
| 6,101,547 A * | 8/2000 | Mukherjee et al. ........... 709/231 |
| 6,112,226 A | 8/2000 | Weaver et al. |
| 6,119,154 A | 9/2000 | Weaver et al. |
| 6,138,147 A | 10/2000 | Weaver et al. |
| 6,330,652 B1 * | 12/2001 | Robb ............................ 711/169 |
| 6,401,126 B1 | 6/2002 | Douceur et al. .............. 709/231 |
| 6,438,630 B1 * | 8/2002 | DeMoney ....................... 710/56 |
| 6,578,070 B1 | 6/2003 | Weaver et al. |
| 6,578,093 B1 * | 6/2003 | Armen et al. .................... 710/52 |
| 6,606,112 B1 * | 8/2003 | Falco ......................... 348/14.12 |
| 6,751,637 B1 * | 6/2004 | Hitz et al. ............................ 1/1 |
| 6,760,807 B2 * | 7/2004 | Brant et al. .................... 711/114 |
| 7,058,721 B1 | 6/2006 | Ellison et al. |
| 7,080,400 B1 | 7/2006 | Navar |
| 7,206,899 B2 * | 4/2007 | Schmisseur ................... 711/114 |
| 7,561,515 B2 | 7/2009 | Ross |
| 7,577,763 B1 * | 8/2009 | Beaman ............................ 710/6 |
| 8,301,857 B2 * | 10/2012 | Ogasawara ................... 711/170 |
| 2002/0013864 A1 * | 1/2002 | Dandrea et al. ................... 710/6 |
| 2003/0182503 A1 * | 9/2003 | Leong et al. .................. 711/114 |
| 2006/0005224 A1 | 1/2006 | Dunning et al. |
| 2006/0288416 A1 * | 12/2006 | Costea et al. .................. 726/24 |
| 2008/0074775 A1 * | 3/2008 | Reichelt et al. ................ 360/55 |
| 2009/0083811 A1 | 3/2009 | Dolce et al. |
| 2009/0083813 A1 | 3/2009 | Dolce et al. |
| 2009/0182939 A1 | 7/2009 | Hluchyj et al. |
| 2010/0189122 A1 | 7/2010 | Dandekar et al. |

FOREIGN PATENT DOCUMENTS

| EP | 1 365 587 | 11/2003 | |
| EP | 1 729 300 | 12/2006 | |
| WO | 98/54646 | 12/1998 | ............ G06F 11/10 |
| WO | 02/08917 | 1/2002 | ............ G06F 13/14 |
| WO | WO 2007/028245 | 3/2007 | |

OTHER PUBLICATIONS

Patterson, D. et al. "A Case for Redundant Arrays of Inexpensive Disks (RAID)," ACM, 1988, 8 pages.

Narashimha Reddy, A.L., et al. "An Evaluation of Multiple-Disk I/O Systems," IEEE Transactions on Computers, vol. 38, No. 12, Dec. 1989, 11 pages.

Chen, P., et al. "RAID: High-Performance, Reliable Secondary Storage," ACM Computing Surveys, 69 pages.

Carretero et al., "A hierarchical disk scheduler for multimedia systems," Future Gen. Comp. Sys., vol. 19 (2003), pp. 23-35.

Mourad, "Issues in the design of a storage server for video-on-demand," Multimedia Sys., vol. 4 (1996), pp. 70-86.

International Search Report for International Application No. PCT/US2009/030492, Date of Mailing Jun. 12, 2009 (2 pages).

Patterson, D. et al. "A Case for Redundant Arrays of Inexpensive Disks (RAID)," ACM, 1988, 8 pages(Jun. 1988).

Chen, P., et al. "RAID: High-Performance, Reliable Secondary Storage," ACM Computing Surveys, 69 pages(Jun. 1994).

Carretero et al., "A hierarchical disk scheduler for multimedia systems," Future Gen. Comp. Sys., vol. 19 (2003), pp. 23-35(Jan. 2003).

Mourad, "Issues in the design of a storage server for video-on-demand," Multimedia Sys., vol. 4 (Apr. 1996), pp. 70-86.

Zhang, Y., et al., "Integrated Rate Control and Buffer Management for Scalable Video Streaming," IEEE, 248-251 (Jul. 2-5, 2007).

Zhang, Y., et al., "Joint Rate Allocation and Buffer Management for Robust Transmission of VBR Video," Acta Automatica Sinica, 34(3):337-343(Mar. 2008).

Response to the Non-Final Office Action for U.S. Appl. No. 12/013,363 dated: Jan. 5, 2011, 21 pages.

Zhang, Y., et al., "Integrated Rate Control and Buffer Management for Scalable Video Streaming," IEEE, 248-251 (2007).

Non-Final Office Action for U.S. Appl. No. 12/013,363. Mailing date: Sep. 9, 2010, 22 pages.

Office Action from U.S. Appl. No. 12/013,363 dated Sep. 19, 2012, 7 pgs.

* cited by examiner

|   | 1 | 2 | 3 | ... | | L |
|---|---|---|---|---|---|---|
| 1 | A1 | B4 | J5 | | Y6 | J1 |
| 2 | C2 | D1 | M7 | | T5 | |
| 3 | D3 | F5 | N4 | | A4 | U7 |
| ... | F4 | G4 | R5 | | J7 | E4 |
| ... | G5 | H5 | Q5 | | P9 | N6 |
| M | H8 | L4 | Z3 | | Q3 | K8 |

Content Read Time Units 1110

Storage Device 1120

|  | 1 | 2 | 3 | 4 | 5 | 6 |
|---|---|---|---|---|---|---|
| 1 | A2 |  | A2 |  | A2 |  |
| 2 | D2 |  |  | C2 |  | G2 |
| 3 |  | H2 | F2 |  |  |  |
| 4 |  |  |  |  | E9 |  |
| 5 |  |  |  | M7 | B3 | B3 |

Content Read Time Units
1310

Storage Device
1320

|   | Content Read Time Units 1310 | | | | | |
|---|---|---|---|---|---|---|
| Storage Device 1320 | 1 | 2 | 3 | 4 | 5 | 6 |
| 1 | E1 | E2 | E1 | E2 | E1 | E2 |
| 2 | D2 | E2 | E2 | C2 | E2 | G2 |
| 3 | E2 | E2 | F2 | E2 | E2 | E2 |
| 4 | E2 | H2 | E2 | E2 | E9 | E2 |
| 5 | E1 | E1 | E1 | M7 | B3 | B3 |

Content Read Time Units
1310

| Storage Device 1320 | 1 | 2 | 3 | 4 | 5 | 6 |
|---|---|---|---|---|---|---|
| 1 | D2 |  |  |  |  |  |
| 2 | A2 | H2 | B3 | C2 |  | G2 |
| 3 |  |  | F2 |  |  |  |
| 4 |  |  | A2 | M7 | E9 |  |
| 5 |  |  |  |  |  |  |

Content Read Time Units
1510

| | 1 | 2 | 3 | 4 |
|---|---|---|---|---|
| 1 | S2 | | | |
| 2 | | S3 | | S1 |
| 3 | | | S4 | |

Storage Device
1520

Content Read Time Units
1510

| | 1 | 2 | 3 | 4 |
|---|---|---|---|---|
| 1 | H2 | | H4 | |
| 2 | | H1 | H3 | |
| 3 | | | | |

Storage Device
1520

STORAGE OF DATA UTILIZING SCHEDULING QUEUE LOCATIONS ASSOCIATED WITH DIFFERENT DATA RATES

CROSS REFERENCES TO RELATED APPLICATIONS

This application relates to and is assigned to the same entity as the co-pending application entitled "Asynchronous and Distributed Storage of Data," U.S. patent application Ser. No. 12/013,363, filed on Jan. 11, 2008, the disclosure of which is hereby incorporated herein by reference.

FIELD OF THE INVENTION

The present invention relates generally to computer-based methods and apparatuses, including computer program products, for a data storage system.

BACKGROUND

Data storage systems are an integral part of today's enterprise, Internet and service provider infrastructure solutions. In general, there is an underlying requirement to reliably store vast quantities of information and to be able to rapidly access and deliver this stored information at high speeds under conditions of simultaneous demand from many users.

The increasing capacity of hard disk drive technology over the years has satisfied the requirement for cost-effective storage of information. However, the mechanical nature of the spinning magnetic platters and actuating arms of the hard disk has limited the bandwidth of writing and reading information. Also, the mechanical nature of hard drives makes them more failure prone, requiring additional techniques for reliable storage.

RAID (Redundant Arrays of Inexpensive Disks) is a common storage technology used in the industry to overcome bandwidth and reliability limitations of single disk drives. As illustrated in FIG. 1, multiple disk drives are arrayed with information stored in a striped fashion, where each disk is given just a portion of a file. In this manner, a file written to or read from the disk array can be done in parallel whereby the bandwidth of reading/writing is equal to the aggregate bandwidth of the disks. In this way, the bandwidth of the RAID increases proportionally with the number of disks in the array; so two disks in a RAID can have twice the bandwidth of a single disk and three disks three-times the bandwidth and so on. Moreover, parity information can be included in the stripe to allow information to be retrieved even under conditions of disk failure, thus accommodating the requirement of reliable information storage. RAID technology is well known in the industry, described in U.S. Pat. No. 4,092,732, "System for Recovering Data Stored in Failed Memory Unit," expanded in Patterson, et al, "A Case for Redundant Arrays of Inexpensive Disks (RAID)," SIGMOD Conference 1988, pp 109-116 and later surveyed by Chen et al, "RAID: High-Performance, Reliable Secondary Storage," ACM Computing Surveys, June 1994, pp 145-185.

RAID technology is particularly well suited for and commonly used in video streaming storage systems where continuous multimedia content (e.g., video, audio, data) is streamed from storage to television set top boxes (STBs), personal computers, mobile phones and other multimedia devices at a rate compatible with the continuous and uninterrupted display of the content to the user. Streamed multimedia content, likely encoded in a compressed format such as ITU Recommendation H.262 (MPEG-2) or H.264 (MPEG-4 Advanced Video Coding), is stored in a striped fashion with parity in a RAID system. Bandwidth is increased by incorporating more disks in the array and storage capacity is increased by increasing the number of disks in the array and/or increasing the capacity of each disk.

However, there are limits to how large one can make a RAID. While increasing the number of disks increases the bandwidth of the storage system, it also decreases the reliability as the mean-time-to-failure of a 10-disk array is 10-times shorter than a single disk. Incorporating parity in the stripe helps alleviate reliability problems, however, with large arrays one has to consider protecting against multiple disk failures. Simple parity schemes provide protection against single disk failures and using Reed-Solomon coding techniques one can protect against multiple disk failures (see Plank, "A Tutorial on Reed-Solomon Coding for Fault-Tolerance in RAID-like Systems," Software, Practice & Experience, September, 1997, pp. 995-1012). Practical constraints typically limit RAID storage systems to fewer than twenty-four disks.

By way of example, a High Definition (HD) MPEG-2 video stream can consume as much as 19 Mb/s. The read access bandwidth of a single disk can support approximately twenty such HD MPEG-2 streams so that a RAID storage system with twenty-four disks can support access for four hundred and eighty unique streams, not accounting for disk redundancy with parity or other error correcting coding techniques. A telco video hub office or cable headend providing service to 200,000 homes, each home with three HD television sets, would need the equivalent of one hundred and twenty-five such 24-disk RAID storage systems to satisfy the streaming bandwidth requirements with only ten percent of the served televisions concurrently receiving video on demand programming. Newer video coding algorithms like MPEG-4 AVC can reduce the required stream bandwidth by more than one-half, but still not sufficient to satisfy the streaming requirements of a telco video hub office or cable headend with a single RAID storage system.

FIG. 2 illustrates an exemplary system to increase the RAID size, and consequently increase the overall available bandwidth of the storage system, without reducing its reliability is to employ a two-dimensional disk array with parity checking along both dimensions. Content blocks are striped horizontally at the disk controller level and then striped vertically from each disk controller to the disks under its control. Parity is computed vertically to protect against disk failures and computed horizontally to protect against controller failures. The content is effectively striped across all disks in the storage system to provide an effective bandwidth for the aggregate of served streams equal to the sum of the bandwidths of all disks. The storage system reads from each and every disk in the storage system in order to check the parity along both dimensions and correct any errors before streaming the content. Each disk controller reads a block from each disk under its control and checks/corrects errors in the vertical directions, and the storage system controller then checks for errors along the horizontal direction, after which the content can be streamed. This results in a large memory buffer for each stream equal to the stripe size of the entire two-dimensional disk array. There is also increased latency before streams can be delivered as each stream must contend for access to the storage system before retrieving a complete data stripe.

The streaming bandwidth of a RAID storage system can be increased without resorting to large disk arrays, and their associated drawbacks, through the use of a Dynamic Random Access Memory (DRAM) cache. Here, highly popular content is cached in DRAM from the RAID storage system and simultaneously streamed at high bandwidth to multiple users, often limited only by the capacity of the network interface ports of the storage system. DRAM, however, is expensive and consumes significant power, and as a consequence there are practical limits to the amount of content that can be stored in DRAM. A two-hour HD movie encoded at 19 Mb/s using MPEG-2, consumes 17G bytes of storage where practical limits of off-the-shelf server technology places a limit of 64G bytes of DRAM storage, not quite enough for four movies. Again, MPEG-4 AVC can more than double this, but even eight or nine movies are hardly sufficient storage given the diversity of tastes and interests of viewers. Special purpose designed DRAM streaming storage systems, accommodating one or more Terabytes of DRAM content storage, provides a larger cache, but still relatively small compared to desired content library sizes, and comes at the expense of much greater cost and power consumption.

To increase video streaming capacity beyond that of a single RAID storage system, video servers are often deployed using clustering techniques. Here multiple streaming servers, each with its own RAID, are used to serve a group of users whose streaming bandwidth requirement exceeds that of a single streaming server. Each streaming server can be provisioned with identical content files to ensure that any user assigned to a streaming server in the cluster can gain access to a desired content. Alternatively, different content can be allocated to different streaming servers and then users assigned dynamically to streaming servers after content selection is made. Here, a larger content library can be offered to users owing to the larger storage afforded by multiple RAID storage systems, each with different content files. However, popular content may need to be stored on multiple streaming servers and content files may need to be moved from server to server to facilitate load balancing of user requests for content. Since the process of replicating content files on servers and moving content files among servers for load balancing is not instantaneous, there is an inherent inefficiency in assigning content and users to servers, and in reacting to sudden changes in the popularity of and demand for certain content.

SUMMARY OF THE INVENTION

In one aspect, there is a method. The method includes receiving, at each storage module in a plurality of storage modules, a data file request from a delivery module. The method further includes determining, at each of the storage modules, a start location for a part of a data file associated with the data file request. The method further includes determining asynchronously, at each of the storage modules, a queue location within a scheduling queue to associate with the data file request. The method further includes adding asynchronously, at each of the storage modules, the part of the data file to a data queue based on the queue location within the scheduling queue, a capacity of the data queue, and/or a transmission rate associated with the data file.

In another aspect, there is another method. The method includes receiving, at a first storage module, a data file request from a delivery module and determining, at the first storage module, a first start location for a first part of a data file associated with the data file request. The method further includes determining, at the first storage module, a first location within a first scheduling queue to associate with the data file request and adding, at the first storage module, the first part of the data file to a first output data queue based on the first location within the first scheduling queue, a capacity of the first output data queue, and/or a transmission rate associated with the data file. The method further includes receiving, at a second storage module, the data file request from the delivery module, the second storage module being different than the first storage module and determining, at the second storage module, a second start location for a second part of the data file associated with the data file request. The method further includes determining, at the second storage module, a second location to associate with the data file request, the second location being located within a second scheduling queue which is independent from the first scheduling queue and adding, at the second storage module, the second part of the data file to a second output data queue based on the second location within the second scheduling queue, a capacity of the second output data queue, and/or the transmission rate associated with the data file.

In another aspect, there is a computer program product. The computer program product is tangibly embodied in an information carrier. The computer program product includes instructions being operable to cause a data processing apparatus to receive, at each storage module in a plurality of storage modules, a data file request from a delivery module and determine, at each of the storage modules, a start location for a part of a data file associated with the data file request. The computer program product further includes instructions operable to cause a data processing apparatus to determine asynchronously, at each of the storage modules, a queue location within a scheduling queue to associate with the data file request and add asynchronously, at each of the storage modules, the part of the data file to a data queue based on the queue location within the scheduling queue, a capacity of the data queue, and/or a transmission rate associated with the data file.

In another aspect, there is a system. The system includes a plurality of storage modules, a plurality of storage devices, a storage controller module, a storage queue controller module, and a storage device read controller. Each storage module in the plurality of storage modules includes a plurality of storage devices and a storage controller module. Each storage device is configured to store a part of a data file. Each storage controller module is connected to each of the plurality of storage devices independently and includes a storage queue controller module and a storage device read controller module. Each storage queue controller module is configured to determine a queue location within a scheduling queue to associate with the data file request. The scheduling queue is configured by each storage module asynchronously. Each storage device read controller module is configured to determine a start location on one of the storage devices for a part of a data file associated with the data file request and add the part of the data file to a data queue based on a queue location within the scheduling queue, a capacity of the data queue, and/or a transmission rate associated with the data file.

In another aspect, there is another system. The system includes a means for storage of data. The means for storage of data includes a plurality of means for storing data and a means connected to each of the plurality of means for storing data independently. Each means for storing data stores a part of a data file. The means connected to each of the plurality of means for storing data independently includes a means for determining a queue location within a scheduling queue to associate with the data file request. The scheduling queue is configured by each storage module asynchronously. The means connected to each of the plurality of means for storing data independently further includes a means for determining a start location on one of the storage devices for a part of a data file associated with the data file request and a means for adding the part of the data file to a data queue based on a queue location within the scheduling queue, a capacity of the data queue, and/or a transmission rate associated with the data file.

In yet another aspect, there is another method. The method includes determining, at a storage module, a first queue location from a plurality of queue locations based on a first data rate associated with a first data file. Some queue locations within the plurality of queue locations are associated with a different data rate, thereby enabling the plurality of queue locations to accommodate a plurality of data rates at the storage module. The method further includes determining a second queue location from the plurality of queue locations based on a second data rate associated with a second data file. The second data rate being different than the first data rate. The method further includes processing the first queue location at a first time to enable streaming of the first data file at or above the first data rate. The method further includes processing the second queue location at a second time to enable streaming of the second data file at or above the second data rate.

In another aspect, there is another method. The method includes receiving, at a storage module, a data file request from a delivery module and selecting a first scheduling queue from a plurality of scheduling queues based on a first data rate associated with the data file request. Each scheduling queue being associated with a data rate. The method further includes determining a first queue location within the first scheduling queue based on the data file request.

In another aspect, there is a computer program product. The computer program product is tangibly embodied in an information carrier. The computer program product includes instructions being operable to cause a data processing apparatus to determine, at a storage module, a first queue location from a plurality of queue locations based on a first data rate associated with a first data file. Some queue locations within the plurality of queue locations are associated with a different data rate, thereby enabling the plurality of queue locations to accommodate a plurality of data rates at the storage module. The computer program product further includes instructions being operable to cause a data processing apparatus to determine a second queue location from the plurality of queue locations based on a second data rate associated with a second data file. The second data rate being different than the first data rate. The computer program product further includes instructions being operable to process the first queue location at a first time to enable streaming of the first data file at or above the first data rate and process the second queue location at a second time to enable streaming of the second data file at or above the second data rate.

In another aspect, there is a system. The system includes a storage module. The storage module includes a plurality of storage devices and a storage controller module. Each storage device configured to store a part of a data file. The storage controller module is connected to each of the plurality of storage devices independently. The storage controller module is configured to receive data file request from a delivery module, determine a first scheduling queue from a plurality of scheduling queues based on a data rate associated with the data file request, and determine a first queue location within the first scheduling queue based on the data file request. Each scheduling queue associated with a different data rate.

In another aspect, there is another system. The system is associated with the independent storage of data. The system includes a means for storage of data. The means for storage of data includes a plurality of means for storing data. Each means for storing data stores a part of a data file. The means for storage of data further includes a means connected to each of the plurality of means for storing data independently. The means connect to each of the plurality of means for storing data independently includes a means for receiving data file request from a delivery module, a means for determining a first scheduling queue from a plurality of scheduling queues based on a data rate associated with the data file request, each scheduling queue associated with a different data rate, and a means for determining a first queue location within the first scheduling queue based on the data file request.

In some examples, any of the aspects above can include one or more of the following features. The queue location from within the scheduling queue is removed at a first storage module in the plurality of storage modules. A second queue location within the scheduling queue is determined at the first storage module. At the first storage module, the second part of the data file is added to the data queue based on the second queue location within the scheduling queue, the capacity of the data queue, and/or the transmission rate associated with the data file.

In other examples, at the first storage module, the determining the second queue location within the scheduling queue further is based on the first queue location. At each of the storage modules, the part of the data file in the data queue is transmitted based on a capacity of the delivery module, the transmission rate associated with the data file, and/or a request from the delivery module.

In some examples, the capacity of the delivery module includes a transmission capacity for a network associated with the delivery module, a storage capacity of the delivery module, and/or a storage capacity of a computing device associated with the data file request.

In other examples, at each of the storage modules, the queue location within the scheduling queue is determined asynchronously based on the start location. At the delivery module, a plurality of parts of the data file are received from the plurality of storage modules and the plurality of parts of the data file are assembled into a sequenced data segment.

In some examples, the sequenced data segment is transmitted to a computing device associated with the data file request. The transmission of the sequenced data segment includes employing a real-time transport protocol, a hypertext transfer protocol, a file transfer protocol, a transmission control protocol, an internet protocol (IP), a user datagram protocol, a video streaming over IP, and/or an audio streaming over IP.

In other examples, at the delivery module, a second plurality of parts of the data file or a second data file are received from the plurality of storage modules and the second plurality of parts of the data file or the second data file are assembled into a second sequenced data segment. The scheduling queue is a first scheduling queue and the queue location is a first queue location. At each of the storage modules, a second queue location is determined asynchronously within a second scheduling queue.

In some examples, at each of the storage modules, the second queue location within the second scheduling queue is determining asynchronously based on a second data file request. The first scheduling queue is associated with a different rate than the second scheduling queue.

In other examples, at each of the storage modules, a second start location for a second part of the data file associated with a second data file request is determined asynchronously and a second queue location within the scheduling queue is determined asynchronously. At each of the storage modules, the second part of the data file is added asynchronously to the data queue based on the second queue location within the scheduling queue, the capacity of the data queue, and/or the transmission rate associated with the data file.

In some examples, at each of the storage modules, the parts of the data file within the data queue are removed based on the second data file request and a sequenced data stream is removed based on the second data file request. At each of the storage modules, the start location for the part of the data file associated with the data file request is determined based on index information.

In other examples, the index information is received from the delivery module. At a first storage device within a first storage module, the part of the data file and a second part of the data file are stored in a same block within the first storage device. At a first storage device within a first storage module, the part of the data file is stored and at a second storage device within the first storage module, a second part of the data file is stored.

In some examples, at a first storage device within a first storage module, the part of the data file is stored and at a second storage device within a second storage module, a second part of the data file is stored. At a first storage device within a first storage module, the part of the data file and a second part of a second data file are stored in a same block within the first storage device. The part of the data file being different than and associated with the second part of the second data file.

In other examples, an association between the part of the data file and the second part of the second data file is determined. The association includes a content program association, a program time association, or both. The part of the data file is associated with a first content program and the second part of the second data file is associated with a second content program.

In some examples, at the first storage device within the first storage module, the block from the first storage device is removed thereby removing the part of the data file and the second part of the second data file. A size of the block is a predetermined size based on a memory device used as the first storage device.

In other examples, at each of the storage modules, a plurality of queue locations within the scheduling queue are determined asynchronously for the data file request based on the start location, the capacity of the data queue, and/or the transmission rate associated with the data file. The data file includes a plurality of multimedia content files which are delineated by the parts of the data file.

In some examples, the scheduling queue includes a linked list of queue locations, a table of queue locations, a template of queue locations, and/or a plurality of sub-queues. The scheduling queue includes a table of queue locations, the table includes a plurality of queue locations associated with a maximum number of multimedia segments a storage module is capable of retrieving from storage.

In other examples, the scheduling queue includes a plurality of sub-queues, each sub-queue is associated with an individual storage device and includes a linked list of queue locations. The queue location is associated with a video stream segment.

In some examples, a delivery module is configured to receive a plurality of parts of the data file from the plurality of storage modules and assemble the plurality of parts of the data file into a sequenced data segment. Data is substantially simultaneously read from a plurality of storage devices in a first storage module.

In other examples, the storage controller module includes the storage queue controller and a storage device write controller. The storage queue controller is further configured to determine a write queue location within the scheduling queue to associate with the data file request. The storage device write controller is configured to receive a second part of the data file from an input data queue and store the second part of the data file in a storage device selected from the plurality of storage devices based on the write queue location within the scheduling queue, a capacity of the storage device, and/or a data storage request associated with the data file.

In some examples, the first queue location is within a first scheduling queue and the second queue location is within a second scheduling queue. The first time is determined based on the first data rate and/or a start location of the first data file. The second time is determined based on the second data rate and/or a start location of the second data file.

In other examples, the first scheduling queue is processed at a first time. A second scheduling queue is processed at a second time. The second scheduling queue is associated with a different data rate than the first scheduling queue. The first time and the second time are identical.

In some examples, a time ratio for processing of the first scheduling queue and a second scheduling queue is determined. The time ratio is associated with a data rate associated with each queue. The first scheduling queue is processed at a first time and the second scheduling queue is processed at a second time which is a function of the time ratio to the first time.

In other examples, each scheduling queue is associated with a same data rate. A part of a data file associated with the data file request is added to a data queue based on the first queue location within the first scheduling queue. A second queue location within the first scheduling queue is determined based on the data file request.

In some examples, a second scheduling queue is determined from the plurality of scheduling queues based on the data rate associated with the data file request. A second queue location within the second scheduling queue is determined based on the data file request. A plurality of queue locations are determined based on the data file request and/or the data rate associated with the data file request.

In other examples, the plurality of queue locations are within the first scheduling queue. The plurality of queue locations are within the first scheduling queue and a second scheduling queue. The first queue location is removed from within the first scheduling queue based on a file request update.

In some examples, the data rate associated with the data file request includes a transmission rate of multimedia segments which thereby enables displaying of multimedia content associated with the multimedia segments.

The aspects and/or examples described herein can include one or more of the following advantages. One advantage to the storage techniques is that the careful scheduling of the disk array reduces the large streaming buffers and increased latency of striped systems having a large number of storage devices. Another advantage is that the highly distributed and scalable implementation accommodates content streams of different rates and content streams whose rates vary continuously during the duration of the stream, including variable bit rate (VBR) encoded video, and this increases the efficiency of the delivery of multimedia content to subscribers.

Another advantage is that the reliable, distributed, scalable high-performance storage system can incorporate a large number of low-bandwidth storage devices, which enables the system to simultaneously stream a large number of content files. An additional advantage is that the streaming of a large number of content files is achieved even though each file is only stored once in the system, which decreases the replication of the content files. Another advantage is that any stream can access any content in the system, including all streams simultaneously accessing the same content files or all streams accessing unique content files, which increases the efficiency of the system by decreasing the replication of the content files.

Another advantage is that the storage system utilizes a two-dimensional storage array (i.e., storage modules by storage devices) to organize and control numerous low-bandwidth storage devices to provide a high-performance streaming system. An additional advantage is that the storage system provides low-latency access to content streams without requiring centralized control with synchronized access to all storage devices.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 11 depicts an exemplary scheduling queue.

FIGS. 13A through 13C depict another exemplary scheduling queue.

FIGS. 15A through 15B depict another exemplary scheduling queue.

DETAILED DESCRIPTION

In general overview, a subscriber requests multimedia content (e.g., video and audio program, audio program) from his/her set top box which is connected to the subscriber's television. The set top box communicates with a delivery module located, for example, at a cable headend. The delivery module requests parts of a data file, which includes the requested multimedia content, from a plurality of storage modules. Each storage module retrieves the requested parts, which are typically stored on a plurality of storage devices at each storage module. Each storage module determines independently when to retrieve the requested parts of the data file from storage and transmits those parts from storage to a data queue. Based on a capacity of the delivery module and/or the data rate associated with the subscriber request, each storage module transmits the parts of the data file to the delivery module. The delivery module generates a sequenced data segment from the parts of the data file received from the plurality of storage modules and transmits the sequenced data segment to the subscriber's set top box for displaying on the television.

In another general overview of the storage system, content files are stored as data stripes across a plurality of storage modules. The data stripes are stored across the storage modules via ingestion by a content ingest module in the storage system. In each storage module, the data stripes are stored in a plurality of storage devices. The scheduling of the storage of the content files as data stripes at each storage module is based on queue locations in a scheduling queue. In systems where the storage devices are independently connected to a storage device controller, each of the storage devices can be accessed independently and simultaneously. Upon receiving a request for the content file, a content delivery module in the storage system requests the data stripes from each of the storage modules. The scheduling of the retrieval of the content files from the data stripes at each storage module is based on queue locations in the scheduling queue. The storage system and the aspects of the storage system including the data striping, the storage module, the storage device, the content ingest module, the content delivery module, and the scheduling queue are further described below.

Storage System

Figure 1:
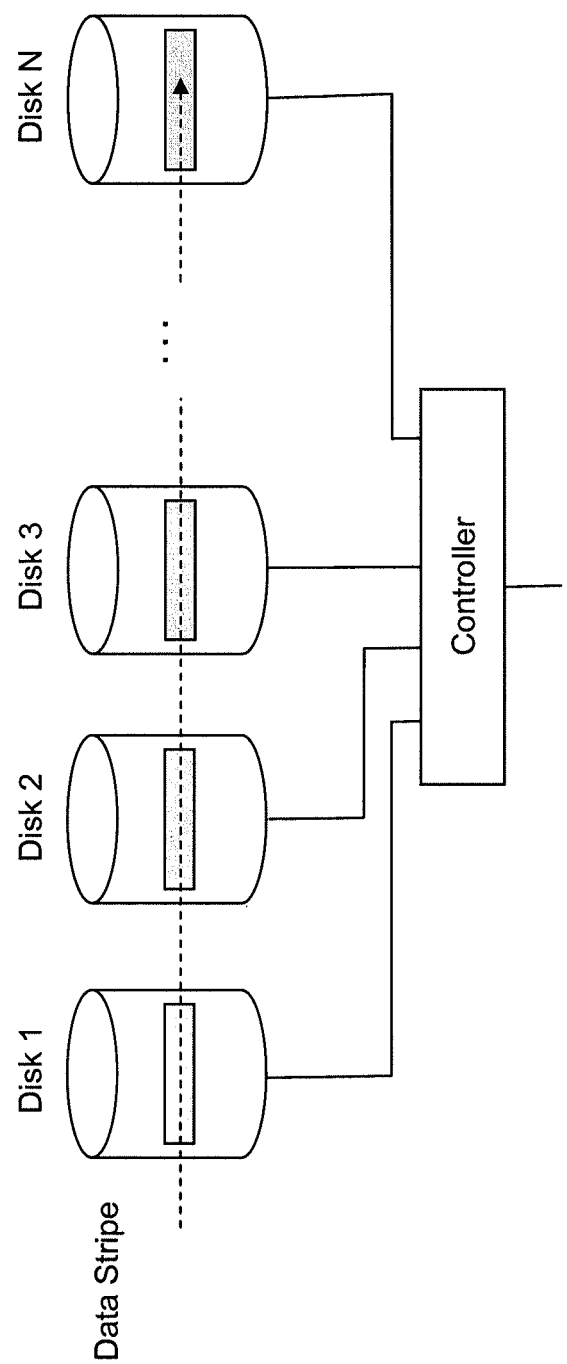
FIG. 1 shows a RAID system known in the art.
Figure 2:
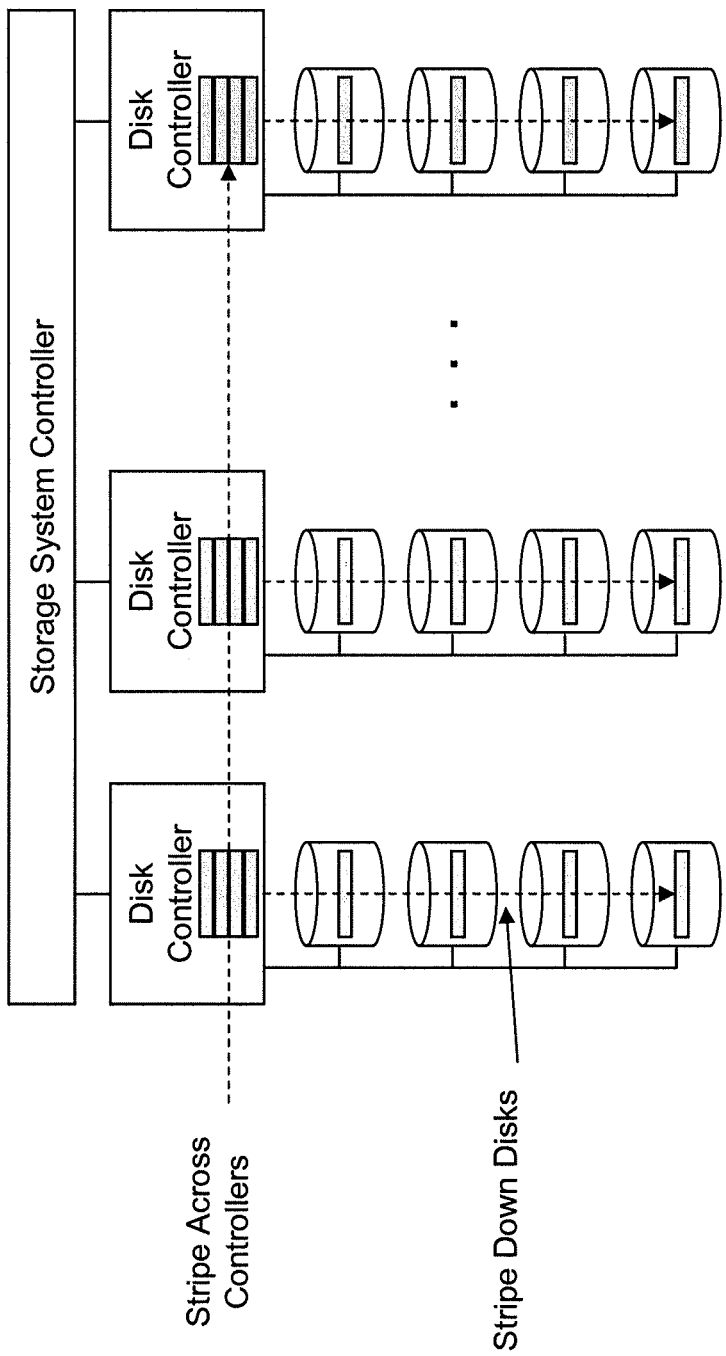
FIG. 2 shows a two-dimensional RAID system known in the art.
Figure 3:
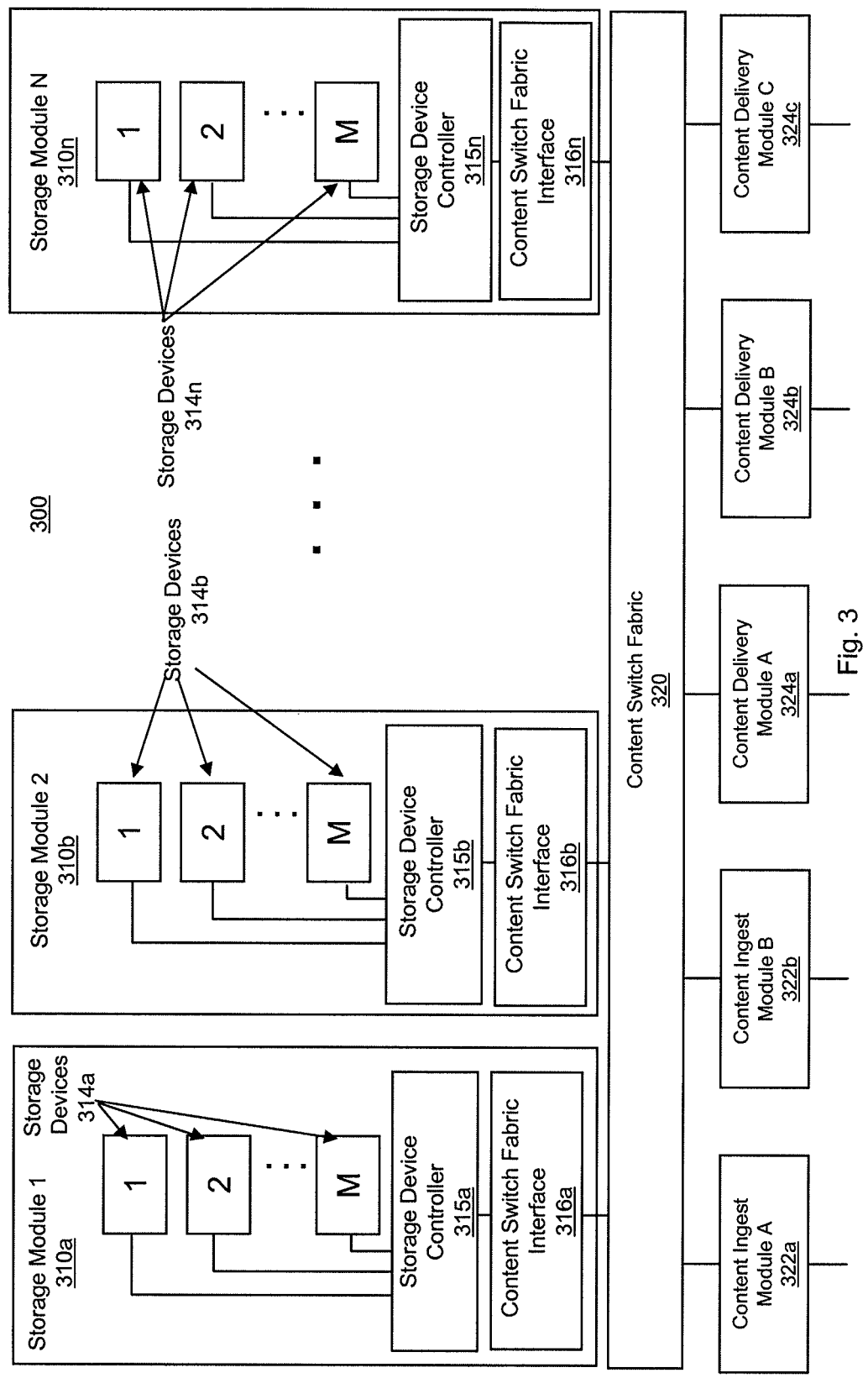
FIG. 3 depicts an exemplary system with a plurality of storage modules.

FIG. 3 depicts an exemplary storage system 300 that includes a plurality of storage modules (e.g., storage module 1 310a, storage module 2 310b through storage module N 310n (generally 310)). The storage system 300 also includes a content switch fabric 320, content ingest modules A 322a and B 322b (generally 322), and content delivery modules A 324a, B 324b, and C 324c (generally 324). Each storage module 310 includes a plurality of storage devices (e.g., 314a, 314b, 314n (generally 314)), a storage device controller (e.g., 315a, 315b, 315n (generally 315)), and a content switch fabric interface (e.g., 316a, 316b, 316n (generally 316)). Although three storage modules are shown in FIG. 3, the storage system 300 can include any number of storage modules (e.g., 2, 4, 20, 40, 100). An advantage is that the operation of the two-dimensional arrayed storage system is optimized for the delivery of streamed content.

A content file enters the storage system 300 through a network interface (e.g., a fiber channel, gigabit Ethernet (GigE), 10 gigabit Ethernet (10 GigE)) connected to a content ingest module 322. The content ingest module 322 delivers the content for storage to the plurality of storage modules 310 using the content switch fabric 320. Each of the storage modules 310 stores the content data in the plurality of storage devices 314 utilizing, for example, data striping as described below.

In response to requests for a stored content file, the storage modules 310 deliver the requested stored content file to an assigned content delivery module 324 by means of the content switch fabric 320. The content file is streamed from the storage system 300 by means of a network interface on the content delivery module 324. The storage device controller 315 on each storage module 310 is in turn connected to a content switch fabric interface 316 used to interconnect the storage module 310 to the content switch fabric 320. The content ingest modules 322 and/or the content delivery modules 324 advantageously act independently in terms of serving the respective content files and content streams assigned to each.

The content is stored in each storage module 310 using the plurality of storage devices 314. Each storage module 310 can include, for example, any number of storage devices (e.g., 2, 10, 20, 50, 100) which are numbered 1 to M. In some examples, each storage device (e.g., devices 1, 2, and M of 314) has a limited bandwidth for writing and reading its memory store. Each storage device (e.g., devices 1, 2, and M of 314) can be, for example, a disk drive, a NAND flash device, and/or any other device that stores data.

In some examples, each storage device (e.g., devices 1, 2, and M of 314) on each storage module 310 has an independent connection to the storage device controller 315 on the storage module 310. The independent connection advantageously allows the storage device controller 315 to concurrently access each storage device (e.g., devices 1, 2, and M of 314) at the full bandwidth of the storage device since the bandwidth of each storage device in some examples can be limited to approximately 200 Mb/s. For example, M ranges from two to twenty-four disks for disk drive storage devices. As another example, M ranges from two to two hundred and fifty six for NAND flash devices. The number of storage devices advantageously can be larger for NAND flash devices because of the small size and low power afforded by NAND flash devices.

In some examples, the storage system 300 is utilized in a general storage system where high aggregate bandwidth access to files from multiple users is required. The storage system 300 can include, for example, a plurality of storage subsystems, computer servers, and/or computer server clusters. In other examples, content files can be rebuilt after a storage module 310 and/or storage device 314 failure by re-ingesting content stripes through a read (with error correction) then write operation.

Data Striping

Figure 4:
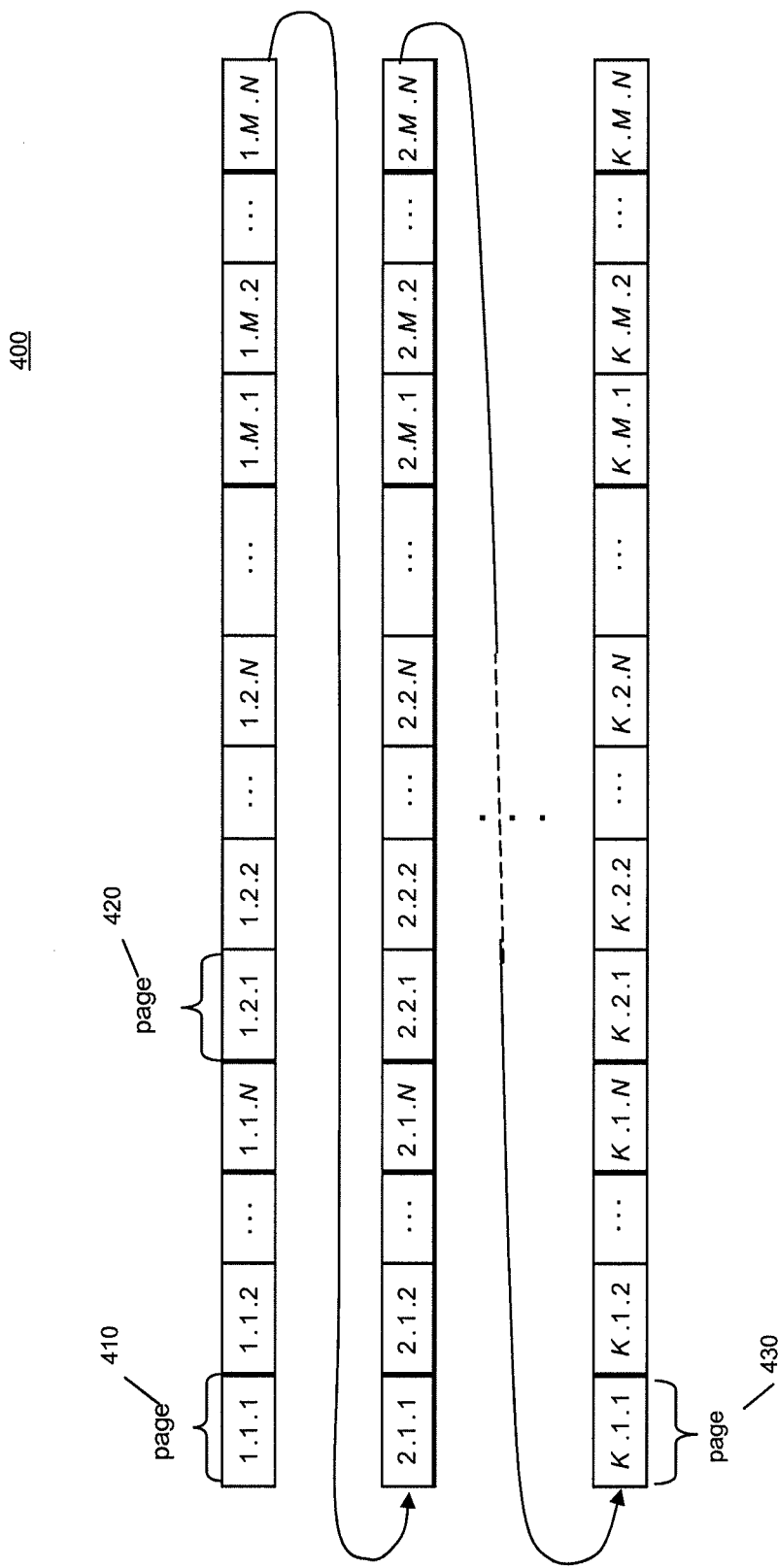
FIG. 4 depicts an exemplary stripping of data among a plurality of storage modules.

FIG. 4 depicts an exemplary striping of data 400 among a plurality of storage modules 310 of FIG. 3. The content in FIG. 4 is striped among the plurality of storage modules 310 and storage devices 314. The content is stored in a two-dimensional stripe fashion among the M storage devices 314 in each of the N storage modules 310 as illustrated in FIG. 3. The unit of storage on each storage device 314 can be, for example, a page 410, 420, and 430. The content file is divided into units equal to a page size and then striped first across the N storage modules 310 and then down the M storage devices 314. To illustrate this in FIG. 4, the consecutive pages (e.g., 410) of a stored content file are label x.y.z where z denotes the storage module 310 number (from 1 to N), y denotes the storage device 314 number (from 1 to M) and x denotes successive N×M two-dimensional stripes stored in the system 300 (with FIG. 4 depicting K successive stripes).

Figure 5:
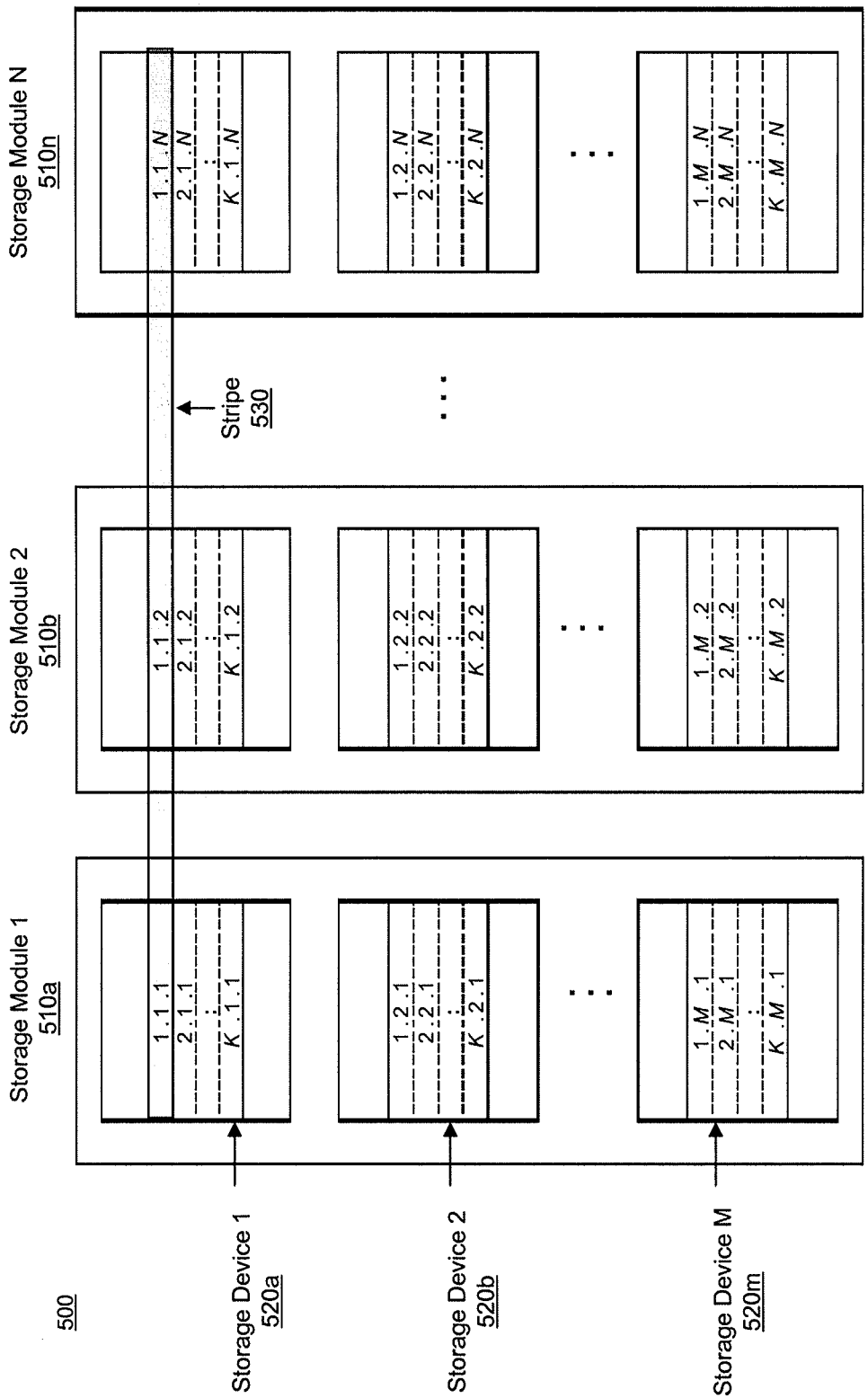
FIG. 5 depicts another exemplary stripping of data among a plurality of storage modules.

FIG. 5 depicts another exemplary striping of data among a plurality of storage modules 510a, 510b, and 510n (generally 510) in a system 500. The data in FIG. 5 is striped among the plurality of storage modules 510 and storage devices 520a, 520b, and 520m (generally 520). A content data file is divided into units equal to a page size and then striped first across the N storage modules 510 and then down the M storage devices 520. The content data file can be, for example, a single multimedia content file and/or a plurality of multimedia content files. The plurality of multimedia content files in the content data file can be, for example, delineated by the parts of the data file (e.g., delineated by pages, delineated by pointers in a file allocation table, etc.).

The stripe 530 of data illustrates an exemplary set of content (e.g., parts of a single multimedia content file, parts of a plurality of multimedia content files, etc.) stored in the system 500. The consecutive pages (e.g., 1.1.1, 1.1.2) of a stored content file are labeled x.y.z, where z denotes the storage module 510 number (from 1 to N), y denotes the storage device 520 number (from 1 to M) and x denotes successive N×M two-dimensional stripes stored in a storage device 520. In the system 500, there are K stripes (e.g., ten, one hundred, five hundred, one thousand) shown in each set of storage devices (e.g., 520a) across the storage modules (e.g., 510a).

If error protection is desired, then the Nth storage module (e.g., 510n) can be utilized, for example, to store a parity page for single page error correction along each N-storage module 510n stripe (e.g., N−1 consecutive content file pages followed by a parity page on the Nth storage module 510n). In other examples, multiple storage modules are used to store error correcting code pages for multiple-page error correction along each N-storage module stripe 530 using, for example, a Reed-Solomon coding technique, a cyclic redundancy check technique, and/or any other type of error detection and correction technique. The error correcting pages are inserted into the content file by the content ingest module (e.g., 322) as the content is stored in a striped fashion on the storage modules 510. In this way, the stored content is advantageously protected against one or more storage module failures.

In some examples, the start location for the content file is determined. The start location can be, for example, determined based on index information and/or data file location information associated with the data file request (e.g., the Super Dog movie starts at storage device 1 and stripe 1 on each storage module 510). The index information can be, for example, created and/or maintained by the ingest module 322, the delivery module 324, each storage module 510 (e.g., each storage module maintains index information for the content files stored on the storage module), and/or each storage device 520 (e.g., file allocation table, directory list, etc.). The index information stored on the ingest module 322 can be, for example, transmitted to each storage module 510 based on a request from a storage module 510 and/or when the delivery module 324 transmits a data file request to each storage module 510.

For example, the data file request is for the Super Cat movie. For storage module 1 510a, the beginning of the Super Cat movie starts at storage device 2 520b in stripe 2. In this example, the start location for this data file request in storage module 1 510a would be 2.2.1. The start location is determined based on index information maintained in a file table at the storage module 1 510a. The file table includes information identifying the start of each content file stored within the storage module 1 510a.

In some examples, the N×M two-dimensional stripe includes parts of a plurality of multimedia content files (e.g., N×M two-dimensional stripe includes last part of a Cat food commercial and the first part of a Dog food commercial, N×M two-dimensional stripe includes last part of the Talking Horse television program and the first part of a Horse feed commercial, etc.). For example, in a two-dimensional system with ten storage modules and sixty four storage devices, the last part of the Cat food commercial is stored in the two-dimensional stripe 1.1.1 through 1.25.6 (in this example, the last 2.0 seconds) and the first part of the Dog food commercial is stored in the two-dimensional stripe 1.25.7 through 1.64.10 (in this example, the first 3.0 seconds). As another example, in a two-dimensional system with ten storage modules and ten storage devices, the last part of the Talking Horse television program is stored in the two-dimensional stripe 1.1.1 through 1.5.10 (in this example, the last 2.0 seconds of the television program) and the first part of the Horse feed commercial is stored in the two-dimensional stripe 1.6.1 through 1.10.10 (in this example, the first 2.0 seconds of the commercial).

In other examples, the N×M two-dimensional stripe includes one or more multimedia content files (e.g., one movie, two television commercials, five radio announcements, a movie and trailer, a movie and commercial, etc.) and/or parts of one multimedia file. For example, the two-dimensional stripe 1.1.1 through 1.M.N can include M parts of a movie where the boundaries for each part of the movie are delineated by the N-page stripe (in this example, the first part of the movie is stored in stripe 1.1.1 through 1.1.N). Although the N-page one-dimensional stripe typically is made of one single multimedia file, the N-page one-dimensional stripe can include, for example, a plurality of multimedia content files that are ingested in sequence (e.g., content ingest module 322 ingests television shows continuously, content ingest module 322 ingests movies that are received continuously, and/or the like).

The plurality of multimedia contents files can be, for example, associated with each other. The association of the plurality of multimedia content files can be, for example, based on a content program association (e.g., commercials associated with a certain content program, announcements associated with a certain content program, trailers associated with certain movie or television programs, etc.) and/or a program time association (e.g., commercials associated with a certain broadcast time, announcements that occur at the same time everyday, etc.).

For example, a car commercial is within a first stripe (in this example, 1.1.1 through 1.1.N) and an automobile insurance commercial is within a second stripe (in this example, 1.2.1 through 1.2.N). The automobile insurance commercial and the car commercial are scheduled to be viewed in sequence. Accordingly, the automobile insurance commercial is stored in the first stripe and then the car commercial is stored in the second stripe.

Table 1 illustrates the storage of parts of data files in a plurality of storage modules and a plurality of storage devices within each storage module.

TABLE 1

Storage of Parts of Data Files in Storage Modules

| Stripe | Content |
| --- | --- |
| 1.1.1 through 1.1.N | Part 1 of Super Cat Movie |
| 1.2.1 through 1.2.N | Part 2 of Super Cat Movie |
| ... | ... |
| 1.8.1 through 1.8.N | Part 8 of Super Cat Movie |
| ... | ... |
| 2.2.1 through 2.2.N | Part 22 of Super Cat Movie |
| 3.1.1 through 3.1.N | Cat Food Commercial |
| 3.2.1 through 3.2.N | Pet Insurance Commercial |
| 6.4.1 through 6.4.N | Part 4 of Wild Life Public Service Announcement |
| 6.5.1 through 6.5.N | Part 5 of Wild Life Public Service Announcement |

Storage Module

Figure 6:
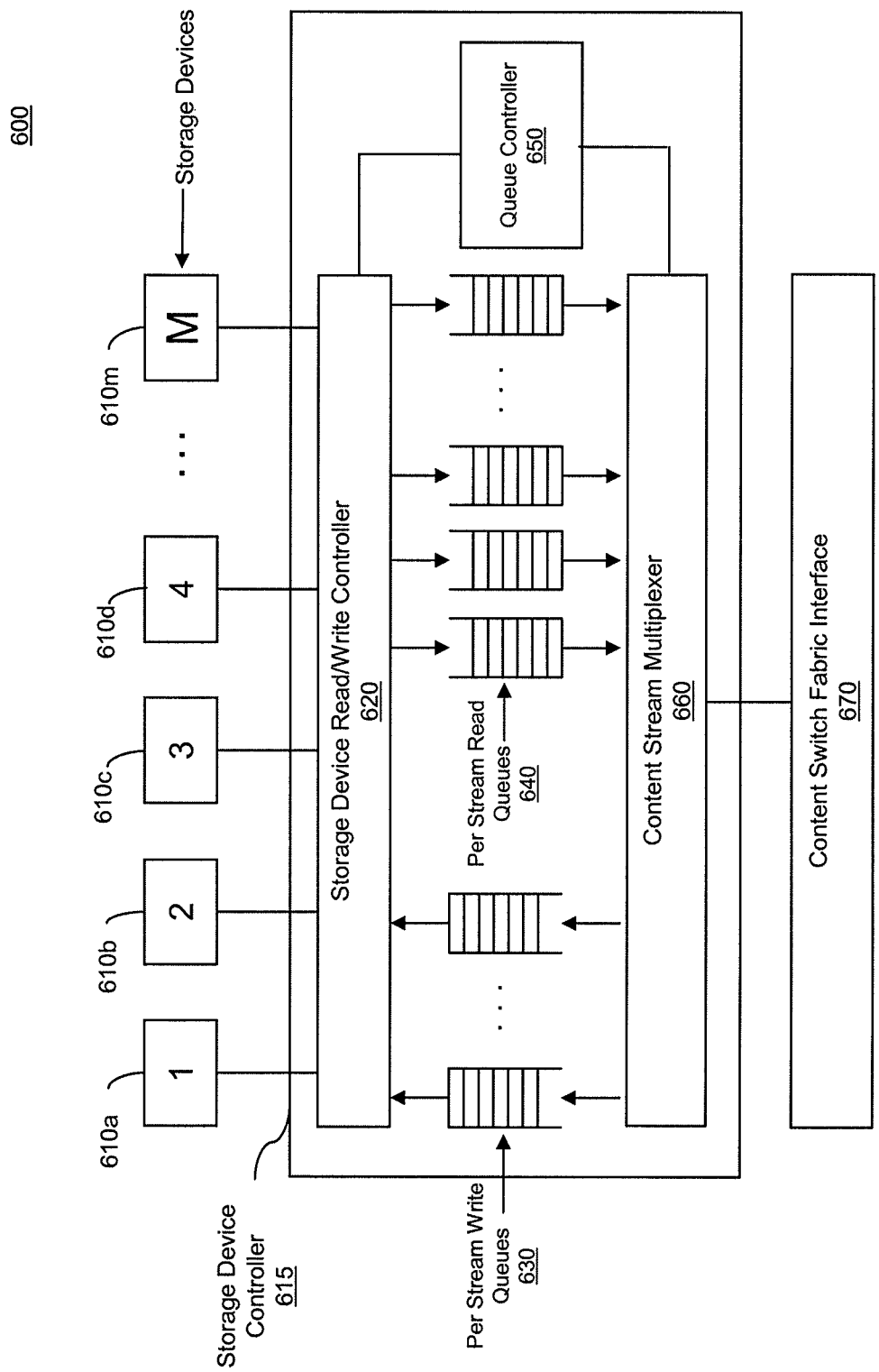
FIG. 6 depicts an exemplary storage module with a plurality of storage devices.

FIG. 6 depicts an exemplary storage module 600. The storage module 600 includes a plurality of storage devices 610a, 610b, 610c, 610d, and 610m (generally 610), a storage device controller 615, and a content switch fabric interface 670. The storage device controller 615 includes a storage device read/write controller 620, a plurality of per stream write queues 630, a plurality of per stream read queues 640 (also referred to as data queues), a queue controller 650, and a content stream multiplexer 660. Through the storage device controller 615, each storage module (e.g., 310 of FIG. 3) advantageously operates asynchronously with respect to the other storage modules (e.g., 310 of FIG. 3) in the reading and writing of content pages on the storage devices 610, thus allowing for a highly distributed storage system without the requirement of careful synchronization of reads and writes across all storage devices 610.

The queue buffers 630 and 640 in the storage device controller 615 provide for the writes and reads of content pages, respectively. The storage device controller 615 includes per stream write queues 630 which are allocated per content stream written and per stream read queues 640 which are allocated per content stream read. Content pages (e.g., 410 of FIG. 4) to be written to the storage devices 610 are buffered in a per stream write queue 630 allowing the scheduling of the writes through the storage device read/write controller 620 on each storage module (e.g., 600) to occur independently from one storage module to another (e.g., 310 of FIG. 3). Reads of content pages (e.g., 420) through the storage device read/write controller 620 are buffered in per stream read queues 640 to allow asynchronous operation of reads from one storage module to another. In some examples, the parts of the data are read from each storage device 610 in the storage module 600 simultaneously or substantially simultaneously. Another advantage of the storage module 600 is that each of the storage devices 610 can be accessed separately and simultaneously which increases the throughput of the storage module 600 and decreases the latency of between content requests and content transmission.

In some examples, the content switch fabric 320 coordinates the simultaneous access of content pages (e.g., 410) in an N-page content stripe (e.g., 530) for the benefit of a content delivery module 324 and/or the per stream read queues 640 allow asynchronous reading of content pages (e.g., 420) among storage modules 310. Storage device read and write cycles can be, for example, allocated and coordinated independently and asynchronously by the queue controller 650 in each storage module 310 (e.g., without regard to scheduling or timing of any other module on which part of the stripe is stored).

Storage Device

Figure 7:
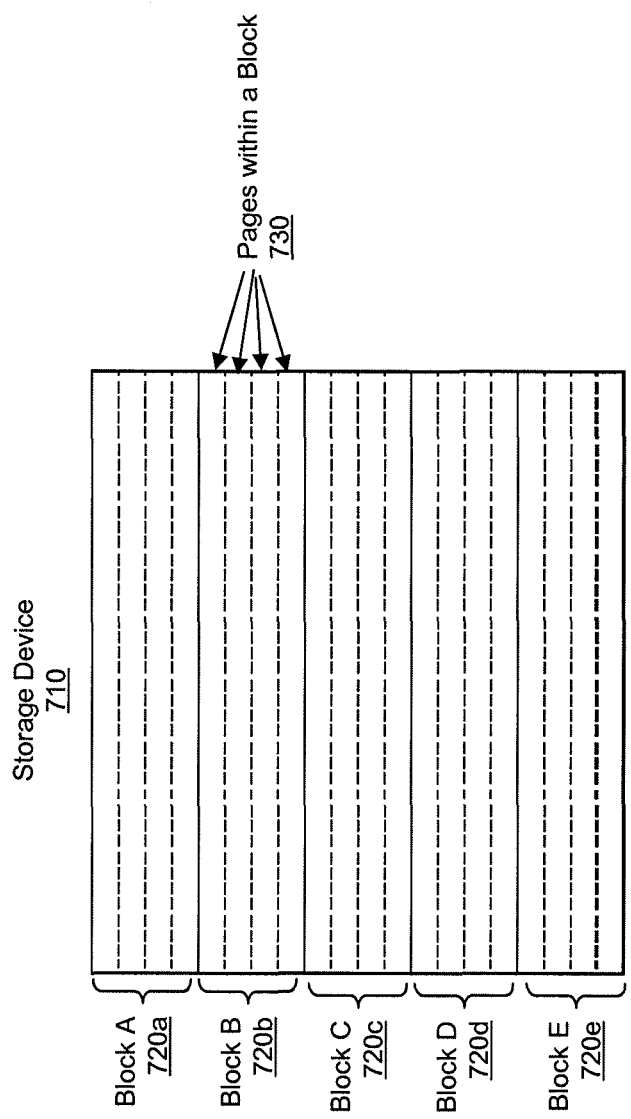
FIG. 7 depicts an exemplary storage device with a plurality of blocks.

FIG. 7 depicts an exemplary storage device 710 in a storage module (e.g., 310a of FIG. 3) with a plurality of blocks 720a, 720b, 720c, 720d, and 720e (generally 720). Each block 720 includes a plurality of pages 730. Parts of data files are stored in the pages 730.

In some examples, a part of a data file (e.g., eight milliseconds of the Super Cat movie) is stored in a page (e.g., first page) of a block (e.g., A 720a) and a part of a different data file (e.g., eight milliseconds of the Cat Food commercial) is stored in a different page (e.g., last page) of the same block (e.g., A 720a). The part of the data file and the part of the different data file can be, for example, different, but associated with each other. The association of the parts can be, for example, based on a content program association and/or a program time association. For example, in a block with ten pages, parts of a Cat movie are stored in the first nine pages (in this example, nine milliseconds of the movie) and a part of a Cat Food commercial is stored in the last page of the block (in this example, one millisecond of the commercial). Table 2 illustrates the storage of parts of data files in a storage device.

TABLE 2

Storage of Parts of Data Files in a Storage Device

| Block | Page | Content |
|---|---|---|
| 1 | 1 | Part 73-2 of Super Cat Movie |
| 1 | 2 | Part 73-5 of Super Cat Movie |
| 1 | 3 | Part 73-8 of Super Cat Movie |
| 1 | 4 | Part 73-11 of Super Cat Movie |
| 2 | 1 | Part 93-1 of Cat Food Commercial |
| 2 | 2 | Part 64-1 of Pet Insurance Commercial |
| 2 | 3 | Part 73-1 of Wild Life Public Service Announcement |
| 2 | 4 | Part 74-1 of Super Cat Movie |

In other examples, the part of the data file (e.g., Super Cat movie) is stored in a page (e.g., first page) of a block (e.g., 720a) at a set time (e.g., 3:46 pm, December 10). A part of a different data file (e.g., Cat Food commercial) is stored in a different page (e.g., second page) of the same block (e.g., A 720a) at a different time (e.g., 4:58 am, December 9). That is, data can be written into blocks a page at a time. The writing of parts of the data file into pages at different time advantageously allows for the maximized utilization of the storage space in the storage.

In some examples, a block 720 (e.g., 720a) in the storage device 710 is removed (e.g., data erased, index information removed). That is, data is removed a block at a time. The block can include, for example, parts of a single content file and/or parts of multiple content files. As described above, when multiple content files are to be stored within the same block, the system can store content files that are associated with each other in the same block. By storing different but associated data files within the same block, the probability that each of the different data files can be deleted at, or near the same time is increased, maximizing the reuse of that block.

In some examples, a block 720 in the storage device 710 is a predetermined size based on a memory device (e.g., NAND device, hard drive device) used as the storage device 710. For example, the page size can be based on the memory device (e.g., 4k bytes, 2k bytes) and the block size can be based on the memory device (e.g., 128 pages/block, 64 pages/block). Multiple stripe sizes can be utilized to accommodate storage system 300 growth as storage modules 310 are added, which advantageously enables the storage system 300 to expand as the storage and/or streaming demands increase.

Figure 8:
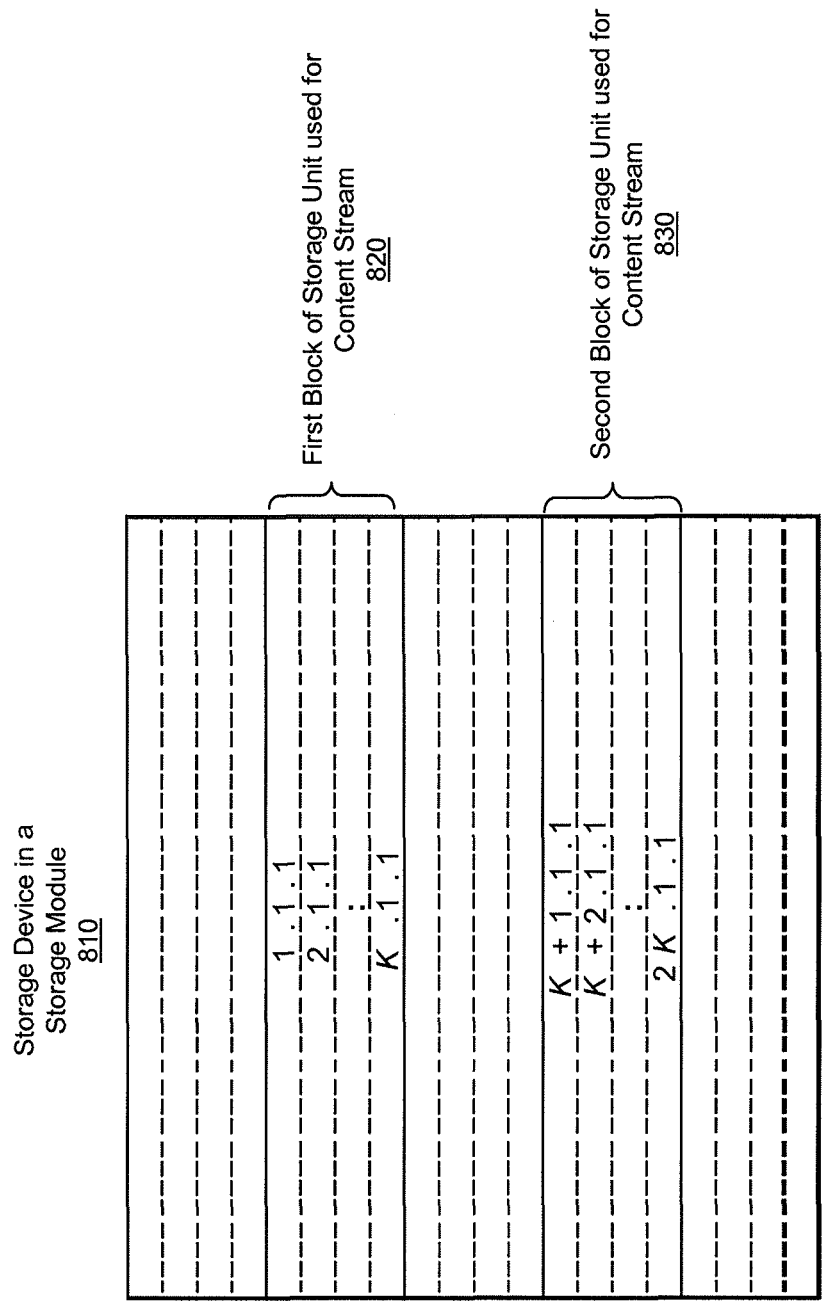
FIG. 8 depicts another exemplary storage device with stored blocks of data.

FIG. 8 depicts another exemplary storage device 810 in a storage module (e.g., 310b of FIG. 3) with stored blocks of data 820 and 830. The stored blocks 820 and 830 illustrate the first block 820 in the storage device used for a content stream and the second block 830 in the storage device used for the content stream.

In some examples, such as NAND flash, the deletion of content in the storage system 300 to make space for new content files requires the unit of memory deletion or erasure to be a block, which comprises multiple pages as shown in FIG. 7. For example, the NAND flash devices have page sizes equal to 2 k bytes and block sizes of 64 pages or 128 k bytes. To facilitate later content file deletion, content files can be, for example, written in such a way that complete blocks are written with the same content file.

In some examples, K is used to denote the block size in pages of a storage unit and FIG. 5 shows the striping 530 of a content file filling a complete block on each of the M storage devices 520 on each of the N storage modules 510 for a total of N*M blocks and N*M*K pages of content. Since a content file may require more than a single block on each storage unit, FIG. 8 shows for storage device 1 on storage module 810, how more than one block is assigned to store a content file. For example, the blocks do not need to be contiguous in the storage device 810 and different storage devices (e.g., 610a and 610b) may use different sets of block locations (e.g., 720a and 720b) to store the contents from a single content file (e.g., Super Cat movie).

As an example, a two-hour HD movie encoded at 19 Mb/s using MPEG-2 requires 17G bytes of storage or 133,594 blocks of 64 pages/block with 2k bytes per page. A 30-second Standard Definition (SD) advertisement encoded at 2 Mb/s using MPEG-4 AVC requires 7.5M bytes of storage or the equivalent of 59 memory blocks. To efficiently accommodate smaller content file sizes in the storage system 300, small content files with approximately the same "time-to-live" can be concatenated into a larger content file and indexed (e.g., index information) to allow access within this content file to any one of the original files. The storage system 300 can index, for example, all content files so that the content files can be accessed at starting points other than the beginning of the file and/or for trick mode operations such as fast forward and rewind.

In some examples, as blocks (e.g., 820, 830) storing the content files become sparsely occupied due to deletion of content files within the content file, any remaining long-lasting content files can be restriped into new content files. This latter method is a form of "garbage collection" used to free up sparsely populated blocks for the storage of new content files.

Content Ingest Module

Figure 9:
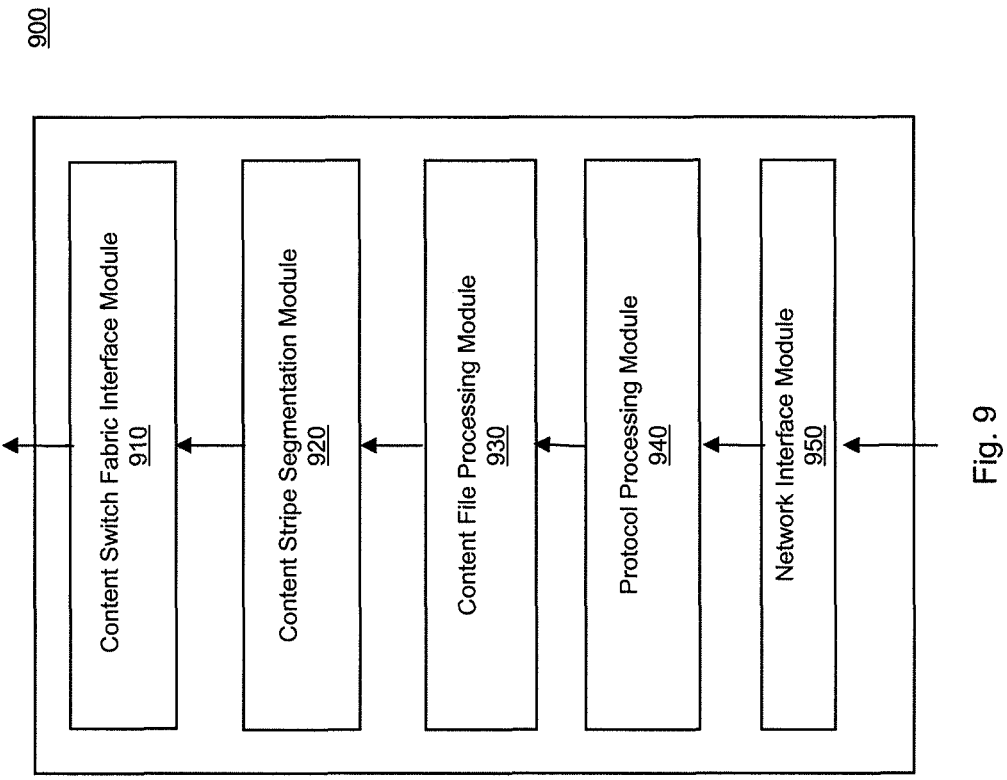
FIG. 9 depicts an exemplary content ingest module.

FIG. 9 depicts an exemplary content ingest module 900 utilized to ingest content files for the storage system 300. The content ingest module 900 includes a content switch fabric interface module 910, a content stripe segmentation module 920, a content file processing module 930, a protocol processing module 940, and a network interface module 950. The content ingest module 900 receives content files from the network interface module 950. The network interface module 950 can support GigE, 10 GigE, and/or any other type of network interface with lower layer protocols supporting, for example, Internet Protocol (IP) at the network layer.

Supported by the protocol processing module 940 of the content ingest module 900, the content file can arrive via a streaming protocol such as Real-Time Transport Protocol (RTP) used in combination with Real-Time Control Protocol (RTCP), which monitors delay, jitter and RTP packet loss. In the case of packet loss, the protocol processing module 940 can request a retransmission of lost packets. In some examples, the protocol processing module 940 can make use of standard techniques of Forward Error Correction (FEC) such as specified in Pro-MPEG Code of Practice 3 to correct for missing RTP packets.

The protocol processing module 940 is responsible for Transmission Control Protocol (TCP) processing. TCP is a connection-oriented protocol that guarantees reliable and in-order delivery of data from sender to receiver. The storage system 300 utilizes TCP to reliably transport content files to and from the storage system 300 and can be used in conjunction with File Transfer Protocol (FTP) and/or Hyper Text Transfer Protocol (HTTP). With either RTP or TCP, the content files can be either completely downloaded to the storage system 300 before delivery by a content delivery module 324 and/or progressively downloaded wherein the content file can begin to be delivered by a content delivery module 324 before completely received by the storage system 300.

In other examples, transport protocol combinations can be supported by the protocol processing module 940. The transport protocol combinations can include, for example, TCP transport of RTP packets containing MPEG Transport Stream (TS) packets, and/or MPEG TS packets carried directly over User Datagram Protocol (UDP) without the benefit or added overhead of RTP. The protocol processing module 940 performs the necessary protocol processing, including stripping away network protocol headers and/or ultimately delivering the content file to the content file processing module 930.

The content file processing module 930 is responsible for preparing the content file for storage including indexing of the content file for use later to allow trick mode operations such as fast forward and rewind. In the case of MPEG TS packets, the content file processing module 930 could delete null packets from a Constant Bit Rate (CBR) MPEG TS to allow more efficient use of the storage system 300.

After content file processing, the content stripe segmentation module 920 segments the content file into pages for striping into the storage modules 310. The content stripe segmentation module 920 can compute, for example, error correction codes (e.g., parity, other multi-page error correction codes) for reliability.

The content stripe is next forwarded to the content switch fabric interface module 910 for delivery to the storage modules 310. The content switch fabric interface module 910 transmits the content to the N storage modules 310 one N-page content stripe at a time (e.g., 530). The content switch fabric 320 is scheduled to allow each content ingest module 322 to share the content switch fabric 320 for the purpose of writing striped content (e.g., 530 of FIG. 5) to the storage modules 310.

Content Delivery Module

Figure 10:
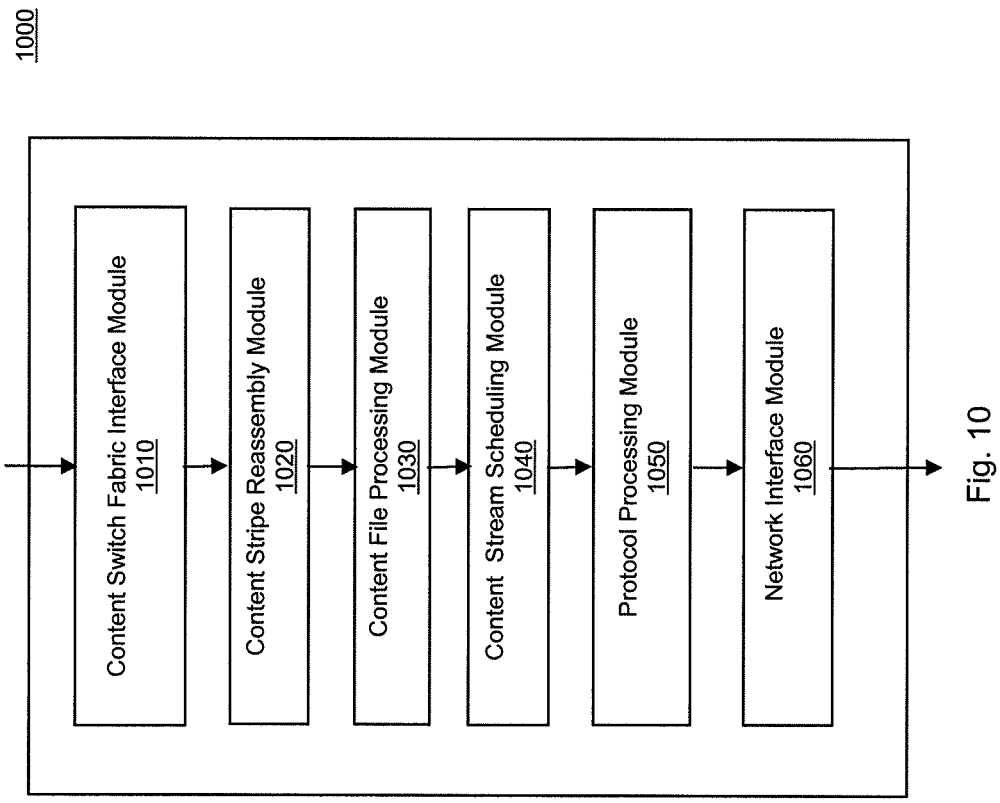
FIG. 10 depicts an exemplary content delivery module.

FIG. 10 depicts an exemplary content delivery module 1000 utilized to deliver content files for the storage system 300. The content delivery module 1000 includes a content switch fabric interface module 1010, a content stripe reassembly module 1020, a content file processing module 1030, a content stream scheduling module 1040, a protocol processing module 1050, and a network interface module 1060.

A signaling message is delivered to the storage system 300 requesting the streaming of a content file to be delivered to a specific network address based on a request for content (e.g., user request, computing device request, file management request, etc.). The network address can, for example, correspond to a television STB, a personal computer, a mobile phone, the storage system 300, and/or any other type of multimedia device.

The storage system 300, through the operation of control plane software operating on one or more of the storage system modules 322, 324 and 310, determines which content delivery module (e.g., 324*b*) to assign to stream the selected content to the user. The assigned content delivery module 1000 initiates the reading of the selected content file from the storage modules 310 by way of control messages (e.g., data file requests, read requests, etc.) sent through the content switch fabric 320 to the storage modules 310. The control messages are forwarded by the content switch fabric interface 316 to the storage device controller 315 on each storage module 310.

The storage device controller 315 on each storage module 310 initiates reads from the appropriate storage devices 314 for the successive content file pages that, in combination with the pages read from the other N storage modules 310, will form the N-page content stripe (e.g., 530) to be delivered to the requesting content delivery module 1000. On request from the content delivery module 1000 for a specified content stream, each storage module 310 responds by delivering through the content switch fabric 320 the content pages residing at the head of its stream read queue (e.g., 640). Being at the head of their respective stream read queues (e.g., 640), these pages correspond to those associated with the next N-page content stripe (e.g., 530) in the content stream (e.g., the content stream includes parts of the content file as retrieved from the content stripe).

The content delivery module 1000 receives the N-page content stripe or part of the content stripe from the content switch fabric 320 via the content switch fabric interface module 1010. The N-page content stripe (e.g., 530) is then reassembled by the content stripe reassembly module 1020 where error correction coding within the stripe is used to correct any correctable errors before passing the content segment to the content file processing module 1030. The content file processing module 1030 concatenates the content files, commonly referred to as "play listing" to seamlessly form a continuous content program from multiple program segments. The content file processing module 1030 can provide, for example, digital program insertion by inserting advertisements in the program stream and/or content format changes such as conversion from MPEG VBR used in the storage system 300 to MPEG CBR required by a user multimedia device (e.g., a television STB).

The content stream scheduling module 1040 determines the transmission time of content file packets. The content stream scheduling module 1040 attempts to avoid decoder buffer underflow and overflow when sending MPEG TS packets to certain multimedia devices such as television STBs. The content stream scheduling module 1040 can utilize RTP time stamps received on ingested streams or Program Clock Reference (PCR) values in the MPEG TS packet headers to determine the delivery time of TS packets to the protocol processing module 1050. The content stream scheduling module 1040 can support, for example, scheduling for trick mode operation where the indexed Presentation Timestamp (PTS) values are used to determine which TS packets to schedule depending on the specific fast forward and/or rewind commands relayed via the multimedia device to the storage system.

The protocol processing module 1050 is responsible for upper layer network protocols used to transport the content stream over the network to the user multimedia device. In some examples, RTP and TCP protocols are accommodated by the network protocol processing module 1050 with support for RTP retransmission for error recovery between the storage system 300 and user device. For RTP, the network protocol processing module 1050 supports, for example, FEC for error correction to accommodate STBs with that mode of packet loss error recovery. For TCP, the protocol processing module 1050 supports, for example, FTP, HTTP and/or other higher-layer protocols.

As with the protocol support on the content ingest module 900, the network protocol processing module 1050 supports other network protocol modes including TCP transport of RTP packets containing MPEG TS packets and MPEG TS packets carried directly over UDP, and/or any other type of network protocol or combination of network protocols. The content file can be, for example, MPEG formatted and/or any other type of multimedia content format.

In some examples, the storage system 300 treats the stored content as a long file that needs to be delivered to a user multimedia device in a continuous fashion. The stored content file can be, for example, streamed faster than real-time to accommodate a fast download service of the content file. For example, a user on a laptop requests that the content be downloaded to the user's laptop so that the user can view the content while not connected to a network (e.g., watch the content while in a car and/or plane).

The RTP and TCP packets generated by the protocol processing module 1050 are forwarded to the network interface module 1060 where lower layer network protocols are supported. From here the assembled network packets are sent to the user device by way of the network interface port (not shown).

Although the content ingest module 900 and content delivery module 1000 are illustrated as two separate modules in FIG. 3 (e.g., 322*a* and 324*b*), the modules could be combined into one module. The single module could share a common network interface port, thus taking advantage of the full-duplex nature of such an interface.

Scheduling Queue

The scheduling queue provides a timing mechanism for how and when data files are written and/or read by the storage modules 310. Each storage module 310 asynchronously and independently determines its own scheduling queue based on information associated with the storage module 310 (e.g., scheduling queue capacity, available queue locations, data queue capacity, etc.) and/or the capacity of the assigned content delivery module 324. As such, each storage module 310 can have a unique scheduling queue or some of the storage modules 310 can have the same scheduling queue but the storage modules 310 determined the same scheduling queue without any input from the other storage modules 310. Each scheduling queue includes a plurality of queue locations which can be empty (i.e., no stream entry) and/or can be occupied by a stream entry (e.g., stream A2, stream B2). FIGS. 11-17 describe different examples and aspects of the scheduling queues for the storage modules 310.

FIG. 11 depicts an exemplary scheduling queue 1100 utilized in the exemplary storage system 300 of FIG. 3. The scheduling queue 1100 includes a table which includes rows 1140 and columns 1130. The rows 1140 correspond to each storage device 1120 (1 through M) and the columns 1130 correspond to content read time units 1110 (1 through L). The L columns correspond to the read capacity in number of streams of a row of N storage devices 314.

A stream number (e.g., C2) corresponding to a specific content stream delivered by the storage system 300 is identified at a particular queue location (e.g., column 1 by row 1 is stream A1) in the scheduling queue 1100. Empty queue locations (e.g., column L by row 2) in the scheduling queue 1100 correspond to unused streaming capacity in the storage system 300. Because of the asynchronous nature of the storage system 300, each storage module 310 creates its own scheduling queue 1100 which can be unique or the same as the scheduling queue of other storage modules 310.

The system calculates L based on the number of storage modules, the bandwidth of the storage devices within each of the modules, and the required streaming rate associated with the content files. For example, a storage system 300 with N=10 storage modules 310 (one storage module used for error correction), where each storage device 314 has a read bandwidth of 200 Mb/s, has a row bandwidth of 200(N-1)= 1800 Mb/s. If the storage system 300 is streaming MPEG-2 SD content files at 3.75 Mb/s, then L=1800/3.75=480 streams/row.

In some examples, to achieve full system bandwidth of the storage system 300, coordination of which pages are read from which of the M storage devices 314 in a storage module 310 at any given time can be used. For a given content file, at any given time during its streaming, a content page stripe needs to be read from the associated stream read queue 640 of FIG. 6 across all N storage modules 310. To achieve full bandwidth of the storage system 300, while one page is being read from one storage device 314, an additional M-1 pages corresponding to the same or different content files for M-1 other content file streams are read from the M-1 other storage devices 314. The scheduling queue 1100 provides for the reading of the content files to achieve the full bandwidth of the storage system 300.

In some examples, to achieve the full bandwidth of the storage system 300, while a stream is read from one storage device (e.g., 610*a*), a different stream can be read from each of the other M-1 storage devices (e.g., 610*b*, 610*c*, 610*d*, 610*m*). For example, in the first column of the scheduling queue 1100, stream A1 is read from the first storage device (e.g., 610*a*) while stream C2 is read from the second storage device (e.g., 610*b*), stream D3 is read from the third storage device (e.g., 610*c*) and so on through the remaining M-3 storage devices. As illustrated in FIG. 5, the reading of a content file progresses from one storage device 520*a* row to the next, with the Mth row wrapping back to the first row (as illustrated in FIG. 4 where page 1.M.N wraps back to page 2.1.1).

Figure 12:
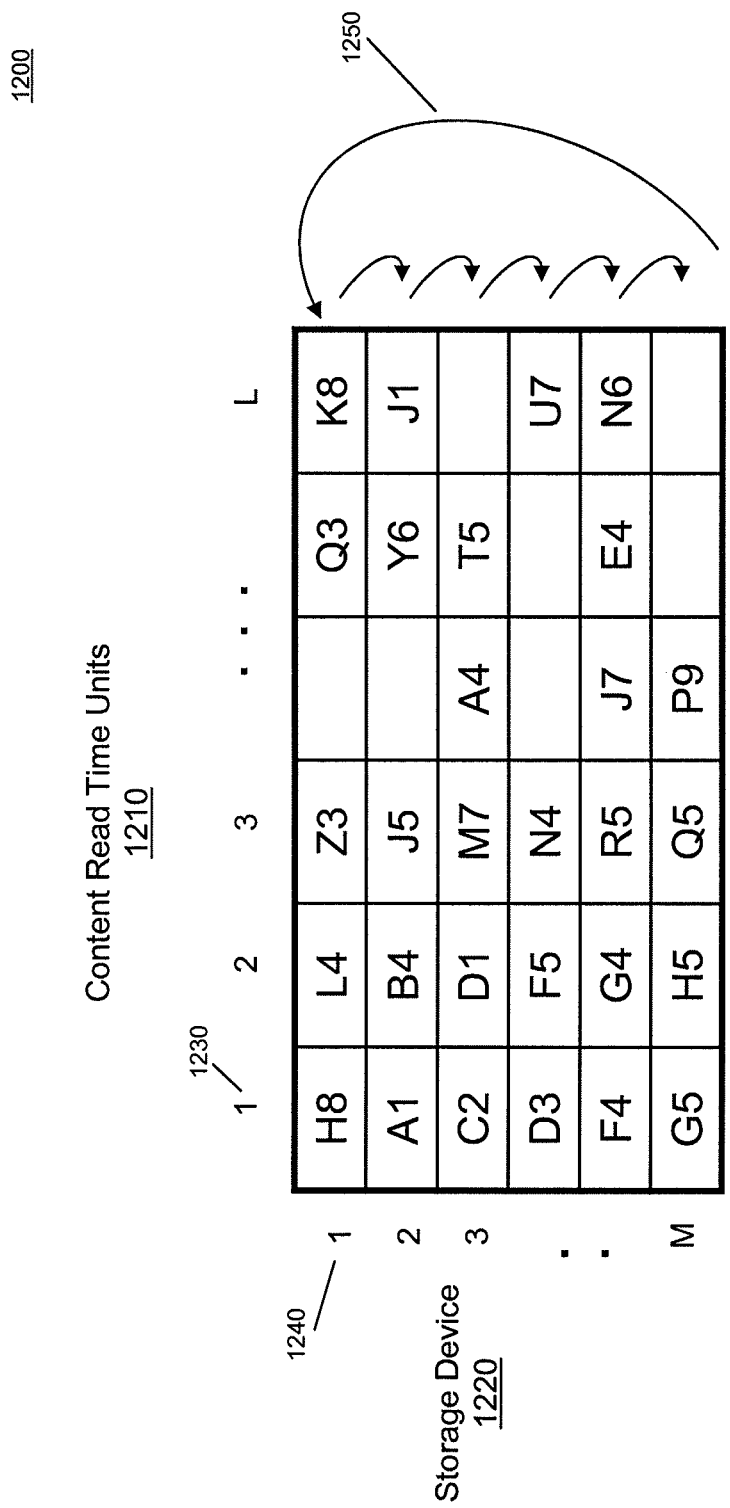
FIG. 12 depicts another exemplary scheduling queue.

FIG. 12 depicts another exemplary scheduling queue 1200. The scheduling queue 1200 corresponds to a new version of the scheduling queue 1100 of FIG. 11. The scheduling queue 1200 includes a table which includes rows 1240 and columns 1230. The rows 1240 correspond to each storage device 1220 (1 through M) and the columns 1230 correspond to content read time units 1210 (1 through L). To read the page (e.g., 420 of FIG. 4) in a storage module 310 corresponding to the next stripe of the content file, the queue locations are barrel shifted 1250 with the first row stream entries shifted to the second row and the second row stream entries shifted to the third row and so on with the Mth row stream entries shifted to the first row. Successive stripe page reads continues the barrel shifting of the queue rows 1240. The barrel shifting of the rows of the scheduling queue 1200 provides for the iteration of the stream entries through the storage devices 1220. Other variations for the iteration of the stream entries through the storage devices 1220 can be, for example, utilized (e.g., assigning a stream entry to each storage device, changing the sequence of the storage devices 1220).

When a new content stream is requested by a user, the stream is assigned an open queue location in the scheduling queue 1200. Likewise, when a content stream is completed or terminated, the stream entry in the queue location is deleted from the scheduling queue 1200, making room for a new stream entry in the queue location. As a result, there may be an initial delay from the time the new stream is requested until the stream entry in the queue location progresses to the storage device 314 corresponding to the beginning of the requested content file. The queue location can be, for example, associated with a single content stream (e.g., a video stream segment being streamed to a user's multimedia device, a data stream segment being streamed to a computer server, etc.).

In the example previously discussed with 3.75 Mb/s MPEG-2 SD streams where L=480 SD streams per storage device row and N=10, if M=64 and the storage device page size is 2 k bytes, then the maximum delay to start a stream is 2,000*8*(N-1)*M/3,750,000=2.5 seconds. The typical delay in a reasonably loaded storage system 300 and with selected queue locations for new stream assignments will advantageously be less than this maximum of 2.5 seconds.

FIGS. 13A through 13C depict another exemplary scheduling queue with a plurality of versions 1300*a*, 1300*b*, and 1300*c* (generally 1300). Each version of the scheduling queue illustrates the scheduling queue 1300 in a different time period (e.g., 3:34 pm, 3:40 pm, 4:42 pm) and/or the scheduling queue 1300 in different storage modules (e.g., 1300*a* in storage module 310a, 1300b in storage module 310b, etc.). The scheduling queue 1300 includes a table of rows and columns. The rows correspond to each storage device 1320 (1 through M) and the columns 1310 correspond to content read time units (1 through L). The L columns correspond to the read capacity in number of streams of a row of N storage devices 314 (e.g., calculated as described above).

The scheduling queue 1300 illustrates a storage module 310 with five storage devices 1320 and six content read time units 1310. The first scheduling queue 1300a illustrates the scheduling queue 1300 with a plurality of queue locations. At the first read time unit (e.g., column 1), stream entry A2 is read from the first storage device (e.g., row 1, which can correspond to, e.g., storage device 610a) and stream entry D2 is read from the second storage device (e.g., row 2, which can correspond to, e.g., storage device 610b). The queue locations for the third storage device (e.g., row 3, which can correspond to, e.g., storage device 610c), the fourth storage device (e.g., row 4, which can correspond to, e.g., storage device 610d), and fifth storage device (e.g., row 5, which can correspond to, e.g., a storage device not shown in FIG. 6) are empty. During this time data can be written to the third, fourth and fifth storage devices, for example, since there is no read scheduled for those devices at that time unit.

The second scheduling queue 1300b illustrates the scheduling queue 1300 with a plurality of occupied queue locations and no empty queue locations. The queue controller 650 determines that there are empty queue locations and inserts stream entries into the empty queue locations to schedule reads of storage devices to enable streaming for those streams corresponding to the stream entries. For example, the stream entries E1 and E2 each represent a stream for transmission to a user utilizing a personal computer that has requested immediate downloading of multimedia content associated with the stream. The second scheduling queue 1300b includes the queue locations as illustrated in the first scheduling queue 1300a and the stream entries E1 and E2 inserted into any of the empty queue locations for maximum bandwidth usage of the storage module 600. The placement of the stream entries E1 and E2 in the empty queue locations can result in the parts of the content being transmitted to the delivery module 324 out of order. As such, the delivery module 324 can reorder the parts of the content for delivery and/or the delivery module 324 can transmit the parts of the content out of order and the computing device can reorder the parts of the content before viewing (in this example, when the user wants an immediate downloading for later viewing).

The third scheduling queue 1300c illustrates the scheduling queue 1300 with a plurality of occupied queue locations and empty queue locations. The high bandwidth stream entries E1 and E2 were removed from the third scheduling queue 1300c. The queue controller 650 removed the stream entries E1 and E2 because the streaming was complete, the capacity of the read queues 640 was reached (e.g., 90% capacity, 100% capacity, etc.), based on one or more rules associated with the scheduling queue 1300c (e.g., high bandwidth stream entries with a low priority are removed after one read/write cycle) and/or other like reasons. The third scheduling queue 1300c also illustrates the change in the queue locations of the stream entries for A2. The stream entries for A2 were removed from some of their associated queue locations in version 1300b because, for example, the stream read queue for A2 was over capacity. In the third scheduling queue 1300c, the stream entries for A2 are included the scheduling queue 1300c, but in different and fewer queue locations.

With VBR content files, streams assigned queue locations in the scheduling queue 1300 can go unused during low rate periods. In some examples, these queue locations can be returned to the assignment pool for use by other streams. As such, the storage system 300 can advantageously achieve a statistical multiplexing of the VBR content streams in the storage system 300 rather than peak rate allocate each stream as with CBR content streams.

In some examples, the per stream read queue 640 level triggers the deletion of a stream entry from the scheduling queue 1300 when the stream read queue level exceeds a high-watermark threshold (e.g., over 90% capacity, over 75% capacity, etc.). The stream entry can be, for example, reinserted into the scheduling queue 1300 (e.g., in the same location, in a different location, etc) when the stream read queue level falls below a low-watermark threshold (e.g., under 50% capacity, under 25% capacity, etc.). The asynchronous operation of each storage module 310 allows its associated storage device controller 315 to independently add and/or delete stream entries without regard to how any of the other storage modules have scheduled those same stream entries in their corresponding scheduling queues. With each storage module 310 operating to keep its associated per stream read queues 640 containing at least one page of content, a complete stripe of content for a stream can be available when requested by a content delivery module 324.

In other examples, a plurality of queue locations within the scheduling queue 1300a are determined based on the start location, the capacity of the data queue, and/or the transmission rate associated with the data file. For example, queue locations assigned to A2 in the scheduling queue 1300a are utilized to stream a data file to a subscriber based on a request associated with a high data rate.

In some examples, the scheduling queue 1300 includes a linked list of queue locations, a table of queue locations (e.g., 1300c), a template of queue locations, and/or a plurality of sub-queues. The table of queue locations can include, for example, a plurality of queue locations associated with a maximum number of multimedia segments the storage module 600 is capable of retrieving from storage (e.g., time units (L) by storage devices provides the maximum number of multimedia segments). The scheduling queue 1300 can include, for example, a plurality of sub-queues and each sub-queue is associated with an individual storage device 610 and includes a linked list of queue locations. For example, each storage device 610 has a linked list of queue locations that is separate from the linked list of the other storage devices in the storage module 600.

Figure 14:
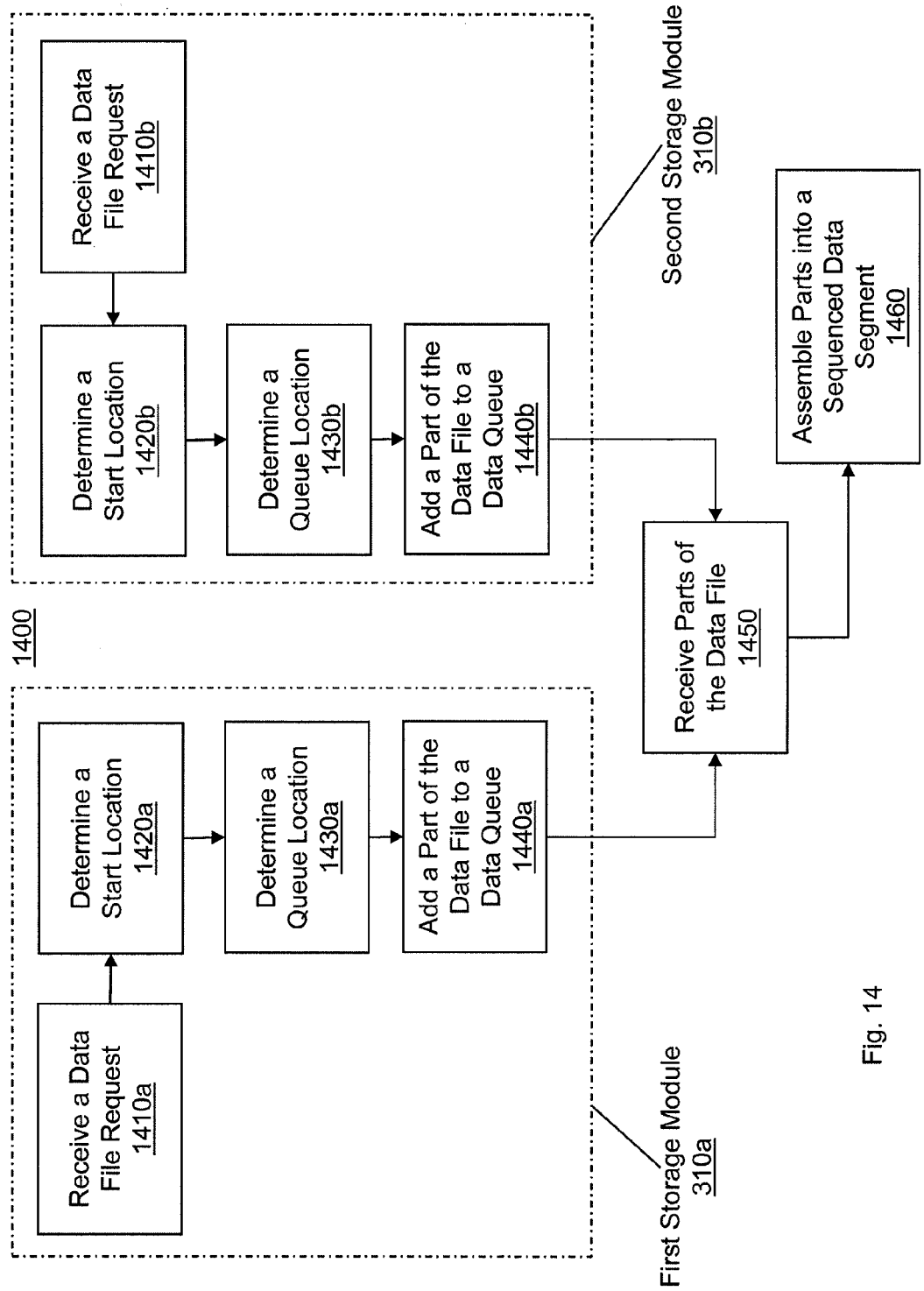
FIG. 14 depicts an exemplary flowchart illustrating assembling parts of a data file into a sequenced data segment.

FIG. 14 depicts an exemplary flowchart 1400 illustrating assembling parts of a data file into a sequenced data segment using the exemplary storage system 300. The content delivery module A 324a transmits a data file request to each of the storage modules 310. The storage module 1 310a receives (1410a) the data file request from the content delivery module A 324a. The storage module 1 310a determines (1420a) a start location for a part of a data file associated with the data file request (e.g., the data file request is a request for a Super Cat movie and the data file includes the Super Cat movie). The storage module 1 310a determines (1430a) a queue location within a scheduling queue to fulfill that request (e.g., a queue location to associate with stream C2 of 1100 of FIG. 11, the stream number assigned to the Super Cat movie). The storage module 1 310a adds (1440a) the part of the data file (e.g., the Super Cat movie) to a data queue (e.g., a per stream read queue, such as 640 in FIG. 6) based on the C2 queue location, a capacity of the data queue in which the retrieved parts of the data file are being place, and/or a transmission rate associated with the data file. The parts of the data file in the data queue are sent to the content delivery module A 324a.

Asynchronously from the storage module 1 310a, the storage module 2 310b receives (1410b) the data file request from the content delivery module A 324a. The storage module 2 310b determines (1420b) a start location for a part of a data file associated with the data file request (e.g., the data file request is a request for a Super Cat movie and the data file includes the Super Cat movie). The storage module 2 310b determines (1430b) a queue location within a scheduling queue (e.g., stream M7 queue location in 1300c of FIG. 13C). In this example, the storage module 2 310b assigns a different stream number to the same request described in the preceding paragraph. In other examples, the storage modules assign the same stream number, but still schedule them independently from each other. The storage module 2 310b adds (1440b) the part of the data file to a data queue (e.g., 640) based on the queue location, a capacity of the data queue, and/or a transmission rate associated with the data file. The parts of the data file in the data queue are sent to the content delivery module A 324a.

The content delivery module A 324a receives (1450) the parts of the data file from the storage module 1 310a and the storage module 2 310b. The content delivery module A 324a assembles (1460) the parts of the data file into a sequenced data segment (e.g., a larger part of the data file in sequenced order). The sequenced data segment is transmitted to a computing device associated with the data file request.

For example, the computing devices associated with the data file request is a user's STB which requested the content file and the sequenced data segment is transmitted to the user's STB. As another example, the computing device associated with the data file request is the storage system 300 which requested the content file and the sequence data segment is transmitted to the content ingest module 322 for ingestion into the storage system 300. The sequenced data segment can include, for example, one or more parts of the content data file. Although typically the content delivery module 324 receives the parts of the data file in sequence, in some examples, the content delivery module 324 receives the parts of the data file out of sequence. Table 3 illustrates the parts of the data file received by the content delivery module 324 out of sequence (in this example, the parts of the data file are out of sequence for transmission) and Table 4 illustrates the sequenced data segment (in this example, the parts of the data file are sequenced for transmission).

TABLE 3

Parts of the Data File as Received

| Sequence | Received from Storage Module | Content |
|---|---|---|
| 1 | Storage Module 1 310a | CatMovie-Part-33-1 |
| 2 | Storage Module 1 310a | CatMovie-Part-36-1 |
| 3 | Storage Module 1 310a | CatMovie-Part-34-1 |
| 4 | Storage Module 2 310b | CatMovie-Part-34-2 |
| 5 | Storage Module 2 310b | CatMovie-Part-33-2 |
| 6 | Storage Module 2 | CatMovie-Part-35-2 |
| 7 | Storage Module 3 | CatMovie-Part-34-3 |
| 8 | Storage Module 1 310a | CatMovie-Part-35-1 |
| 9 | Storage Module 3 | CatMovie-Part-33-3 |

TABLE 4

Parts of the Data File in Sequence

| Sequence | Received from Storage Module | Content |
|---|---|---|
| 1 | Storage Module 1 310a | CatMovie-Part-33-1 |
| 2 | Storage Module 2 310b | CatMovie-Part-33-2 |
| 3 | Storage Module 3 | CatMovie-Part-33-3 |
| 4 | Storage Module 1 310a | CatMovie-Part-34-1 |

TABLE 4-continued

Parts of the Data File in Sequence

| Sequence | Received from Storage Module | Content |
|---|---|---|
| 5 | Storage Module 2 310b | CatMovie-Part-34-2 |
| 6 | Storage Module 3 | CatMovie-Part-34-3 |
| 7 | Storage Module 1 310a | CatMovie-Part-35-1 |
| 8 | Storage Module 2 | CatMovie-Part-35-2 |
| 9 | Storage Module 1 310a | CatMovie-Part-36-1 |

In some examples, the transmission of the sequenced data segment includes employing a real-time transport protocol, a hypertext transfer protocol, a file transfer protocol, a transmission control protocol, an internet protocol (IP), a user datagram protocol, a video streaming over IP, an audio streaming over IP, and/or any other type of network protocol.

In other examples, the storage module 310a removes the stream entry from its associated queue location in the scheduling queue 1300a. The removal of the stream entry from the queue location by the storage module 310a can be, for example, based on an update request associated with the file request (e.g., fast forward, pause, rewind), a capacity of the content delivery module 324, a new file request (e.g., subscriber wants to watch Super Dog movie), and/or any other information associated with the queuing of the data request (e.g., higher priority data file request). An advantage is that the stream entries can be removed from the queue location when the content does not need to be streamed which increases the overall bandwidth of the storage system 300 by allowing other content streams to utilize that particular queue location.

In some examples, the parts of the data file in the read queues 640 are removed based on a second data file request (e.g., fast forward request, rewind request, new channel request, new content request). The sequenced data stream at the content delivery module 324 can be, for example, removed based on the second data file request.

In other examples, a second queue location within the scheduling queue 1300b is determined by the storage module 310. The storage module 310 adds the part of the data file to a data queue (e.g., 640) based on the second queue location, the capacity of the data queue, and/or the transmission rate associated with the data file. The second queue location can be, for example, determined based on the first queue location. The determination of the second queue location can be based, for example, on a second data file request.

For example, the stream entry G2 is removed from its first queue location in scheduling queue 1300a (as illustrated in scheduling queue 1300b, stream entry G2 is removed) because the capacity of the content delivery module 324 is over 90%. The capacity of the content delivery module 324 drops below 90% and the storage module 1 310a adds the content stream associated with the first queue location G2 to the scheduling queue 1300c at the second queue location assigned to stream entry G2. The second queue location of stream entry G2 in scheduling queue 1300c is based on the first queue location of G2 in scheduling queue 1300a (e.g., the next storage device that needs to be accessed is storage device 3 since storage device 2 was the last accessed storage device as illustrated in the first scheduling queue 1300a).

In other examples, the capacity of the content delivery module 324 includes a transmission capacity for a network associated with the content delivery module (e.g., cable network transmission capacity, telco network transmission capacity), a storage capacity of the computing device associated with the data file request (e.g., set top box, computer), and/or any other type of capacity associated with the delivery of stored content.

For example, John Smith, a subscriber, utilizing his set top box (STB) requests the Super Cat movie for immediate viewing. Mr. Smith's STB transmits a data file request for the Super Cat movie to the storage system 300 of FIG. 3. The content delivery module A 324a in the storage system 300 receives the data file request and transmits the data file request to each of the storage modules 310.

The storage module 1 310a receives (1410a) the data file request for Super Cat movie from the content delivery module A 324a. The storage module 1 310a determines (1420a) a start location (in this example, 2.2.1 which is stripe 2 in storage device 2 520b within storage module 1 510a of FIG. 5) for a first part of a movie data file associated with the request for Super Cat movie. The storage module 1 310a determines (1430a) that the optimal queue location in the scheduling queue 1300a of FIG. 13 is queue location time unit 1 by storage device 2 since the first part of the movie data file is in storage device 2 520b (in this example, the stream D2 is associated with queue location time unit 1 by storage device 2). When the scheduling queue 1300a processes the D2 stream entry, the storage module 1 310a adds (1440a) the first part of the data file (in this example, the part stored in 2.2.1) to a data queue for the content stream (e.g., 640). The parts of the data file in the data queue (e.g., 640) are sent to the content delivery module A 324a as the content delivery module A 324a can receive the parts of the data file.

Asynchronously from the storage module 1 310a, the storage module 2 310b receives (1410b) the data file request for Super Cat movie from the content delivery module A 324a. The storage module 2 310b determines (1420b) a start location (in this example, 2.2.2 which is stripe 2 in storage device 2 within storage module 2 510b) for a first part of a movie data file associated with the request for Super Cat movie. The storage module 2 310b determines (1430b) that the optimal queue location in the scheduling queue 1300c is queue location time unit 3 by storage device 2 since the first part of the movie data file is in storage device 2 (in this example, the stream B3 is associated with queue location time unit 3 by storage device 2). When the scheduling queue 1300c processes the B3 stream entry, the storage module 2 310b adds (1440b) the first part of the data file (in this example, the part stored in 2.2.2) to a data queue for the content stream (e.g., 640). The parts of the data file in the data queue (e.g., 640) are sent to the content delivery module A 324a as the content delivery module A 324a can receive the parts of the data file.

The content delivery module A 324a receives (1450) the parts of the Super Cat movie data file from the storage module 1 310a and the storage module 2 310b. The content delivery module A 324a assembles (1460) the parts of the data file into a sequenced data segment (in this example, the viewing sequence of Super Cat movie). The sequence data segment is transmitted to the Mr. Smith's STB for viewing by Mr. Smith.

FIGS. 15A through 15B depict two exemplary scheduling queues 1500a and 1500b (generally 1500). The scheduling queues 1500 include a table of rows and columns. The rows correspond to each storage device 1520 (1 through M) and the columns 1510 correspond to content read time units (1 through L). The L columns correspond to the read capacity in number of streams of a row of N storage devices 314.

The first scheduling queue 1500a is associated with a standard data rate (e.g., standard television) and the second scheduling queue 1500b is associated with a high data rate (e.g., high definition television). The first scheduling queue 1500a includes queue locations for streams associated with the standard data rate and the second scheduling queue 1500b includes queue locations for streams associated with the high data rate. For example, stream entry S2 in the first scheduling queue 1500a is an entry for a stream of Super Cat movie on a standard definition television format (e.g., the movie content file is smaller and so the bandwidth required for the movie is less). As another example, the stream entry H2 in the second scheduling queue 1500b is an entry for a stream of Super Cat move on a high definition television format (e.g., the move content file is larger and so the bandwidth required for the movie is higher).

To accommodate different rate streams concurrently, multiple scheduling queues 1500a and 1500b can be, for example, utilized, one for each rate class (e.g., standard definition (SD), high definition (HD), broadband download, etc.). Each storage module 310 in the storage system 300 can, for example, time-share among the scheduling queues 1500. For example, if the storage system 300 supports SD and HD rates with a ratio of 1-to-4 (i.e., HD consumes four-times the bandwidth of SD), and there is an equal number of streams of each, then the storage module 310 can time-share between the SD and HD scheduling queues 1500a and 1500b, respectively, in the pattern "H-H-H-H-S-H-H-H-H-S-H-H-H-H-S-H-H-H-H-S . . . " with each H entry corresponding to reading a column in the HD scheduling queue 1500a and each S entry corresponding to reading a column in the SD scheduling queue 1500b. Multiple stream rate classes with varying number of streams in each class can advantageously be accommodated with a multi-scheduling queue time-sharing method using time sharing techniques. The time sharing technique can include, for example, a weighted round robin, a round robin, and/or any other type of time-sharing method to determine the order of the scheduling queues.

Figure 16:
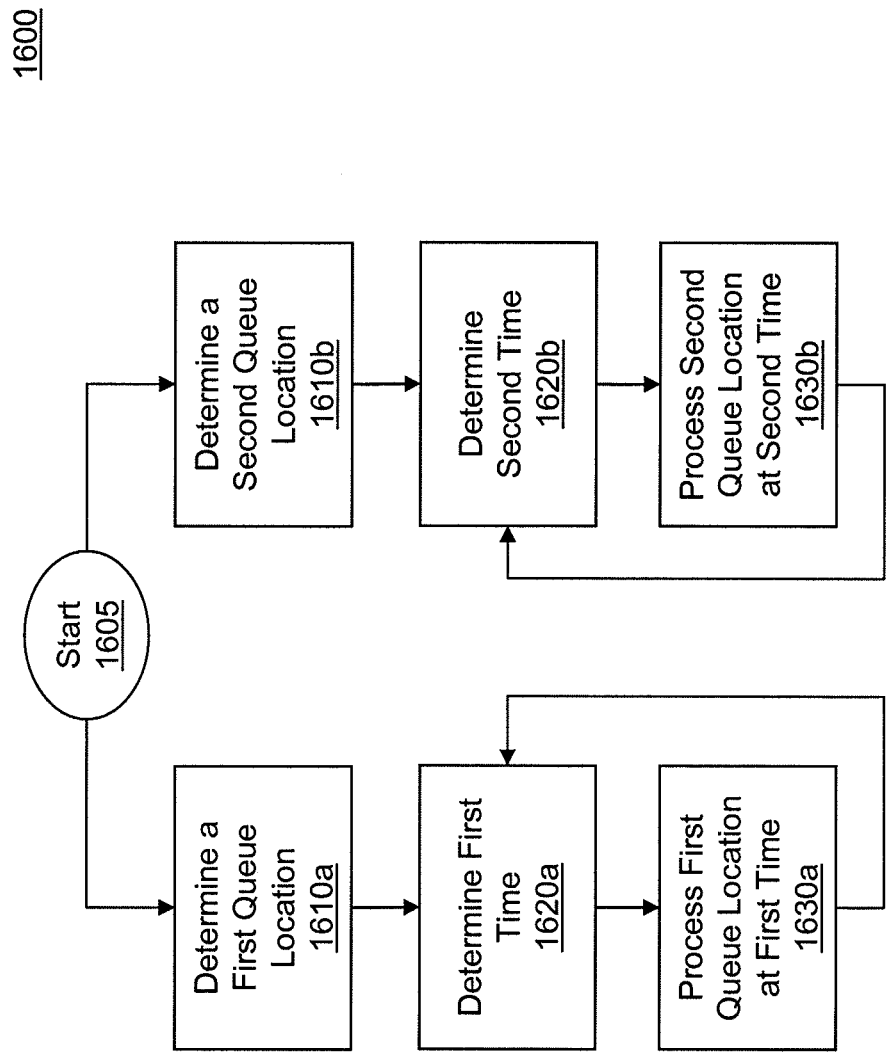
FIG. 16 depicts an exemplary flowchart illustrating processing queue locations.

FIG. 16 depicts an exemplary flowchart 1600 illustrating processing queue locations through the exemplary storage module 600 of FIG. 6. The flowchart 1600 starts (1605). The queue controller 650 determines (1610a) a first queue location from a plurality of queue locations (illustrated in the scheduling queue 1500a of FIG. 15A). The queue controller 650 determines (1620a) a first time for streaming of a first data file. The first time is based on the first data rate (e.g., standard data rate, high data rate, downloading data rate, etc.) and/or a start location of the first data file (e.g., storage device 1, storage device 2, etc.). The queue controller 650 processes (1630a) the first queue location at the first time. The queue controller 650 continues to determine (1620a) the first time for streaming of the first data file and processing (1630a) the first queue location at the first time.

The queue controller 650 determines (1610b) a second queue location from a plurality of queue locations (illustrated in the scheduling queue 1500b of FIG. 15B and/or the scheduling queue 1500a of FIG. 15A). The queue controller 650 determines (1620b) a second time for streaming of the second data file. The second time is based on the second data rate and/or a start location of the second data file. The queue controller 650 processes (1630b) the second queue location at the second time. The queue controller 650 continues to determine (1620b) the second time for streaming of the second data file and processing (1630b) the second queue location at the second time.

In some examples, the first time and the second time are identical. For example, the first queue location is illustrated by the stream entry H4 in scheduling queue 1500b and the second queue location is illustrated by the stream entry H3 in scheduling queue. The stream entries H3 and H3 are both processed at time unit 3 in the scheduling queue 1500b.

In other examples, a time ratio for processing different scheduling queues is determined. The time ratio is associated with a data rate associated with each queue. For example, the scheduling queue 1500*a* is associated with a standard data rate and the scheduling queue 1500*b* is associated with a high data rate. The time ratio required to stream the parts of the data files associated with the scheduling queues is determined based on the data rates for each queue (in this example, high data rate requires twice the data rate as standard data rate. As such, the time ratio is two to 1 for the scheduling queue 1500*b* to the scheduling queue 1500*a*. The scheduling queue 1500*a* is processed at a time (in this example, time period 1) based on this time ratio and the scheduling queue 1500*b* is processed at a different time (in this example, time period 2 and 3—twice the time) based on this time ratio of two to one. The time ratio can be based, for example, on the data rate associated with each scheduling queue and/or the number of streams associated with each scheduling queue. For example, a low data rate scheduling queue has sixteen stream entries and the high data rate scheduling queue has four stream entries and the file ratio between the low data rate and the high data rate is one to four. In this example, the determination of the time ratio utilizes the file ratio (in this example, one to four) and the number of streams (in this example, four to one) to determine the time ratio of one to one. That is, the low data rate scheduling queue will be processed for the same number of times as the high data rate scheduling queue.

For example, Mr. Smith requests Super Cat movie through his laptop for downloading in standard definition on his laptop. The data request is transmitted from Mr. Smith's laptop to the storage system 300. The storage system 300 transmits the data request to the storage module 600. The queue controller 650 determines (1610*a*) a first queue location illustrated by stream entry S4 from the plurality of queue locations in the scheduling queue 1500*a*. The queue controller 650 determines (1620*a*) a first time of time unit 3 for streaming of the first data file. The queue controller 650 processes (1630*a*) the first queue location illustrated by stream entry S4 at the first time of time unit 3 to stream the parts of the video to the read queues 640. The queue controller 650 continues to determine (1620*a*) the first time for streaming of the first data file to ensure that the data file is being streamed at the rate associated with standard definition movies and processing (1630*a*) the first queue location at the first time to ensure delivery of the movie to Mr. Smith's laptop.

At or near the same time, Mr. Smith requests Super Dog movie through his STB for viewing on his high definition television set. The data request is transmitted from Mr. Smith's STB to the storage system 300. The storage system 300 transmits the data request to the storage module 600. The queue controller 650 determines (1610*b*) a second queue location illustrated by stream entry H3 from a plurality of queue locations illustrated in the scheduling queue 1500*b*. The queue controller 650 determines (1620*b*) a second time of time unit 3 for streaming of the second data file. The queue controller 650 processes (1630*b*) the second queue location illustrated by stream entry H3 at the second time at time unit 3. The queue controller 650 continues to determine (1620*b*) the second time for streaming of the second data file and processing (1630*b*) the second queue location at the second time to ensure the timely delivery of the movie at the data rate associated with high definition movies.

Figure 17:
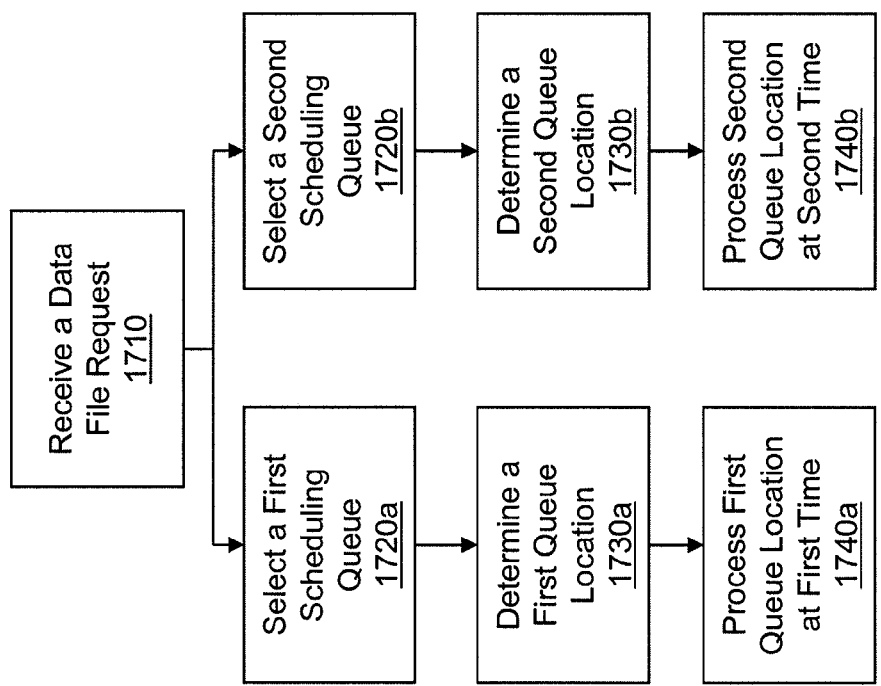
FIG. 17 depicts another exemplary flowchart illustrating processing queue locations.

FIG. 17 depicts an exemplary flowchart 1700 illustrating processing queue locations through the exemplary storage module 600 of FIG. 6. The storage module 600 receives (1710) a data file request. In some example, the storage module 600 may be the only storage module for a particular storage system processing a data file request. The queue controller 650 selects (1720*a*) a first scheduling queue from a plurality of scheduling queues based on a first data rate associated with the data file request. The queue controller 650 determines (1730*a*) a first queue location within the first scheduling queue. The queue controller 650 processes (1740*a*) the first queue location at a first time.

The queue controller 650 selects (1720*b*) a second scheduling queue from a plurality of scheduling queues. The queue controller 650 determines (1730*b*) a second queue location within the second scheduling queue based on a second data rate associated with the data file request. The queue controller 650 processes (1740*b*) the second queue location at a second time.

For example, Betty Smith utilizes her STB to request the Super Lizard movie in high definition. The data request is transmitted from Ms. Smith's STB to the storage system 300. The storage system 300 transmits the data request to the storage module 600. The storage module 600 receives (1710) the data file request for Super Lizard movie. The queue controller 650 selects (1720*a*) the high definition scheduling queue 1500*b* from a plurality of scheduling queues (in this example, 1500*a* and 1500*b*) based on the high definition data rate associated with the data file request. The queue controller 650 determines (1730*a*) queue location illustrated by stream entry H3 within the high definition scheduling queue 1500*b*. The queue controller 650 processes (1740*a*) the stream entry H3 at the queue location at time unit 3 during the scheduling queue 1500*b* processing time.

Based on a data request from Jane Doe for the Super Fish movie in standard definition, the queue controller 650 selects (1720*b*) the standard definition scheduling queue 1500*a* from the plurality of scheduling queues (in this example, 1500*a* and 1500*b*). The queue controller 650 determines (1730*b*) the queue location illustrated by stream entry S3 within the standard definition scheduling queue 1500*a* based on the standard definition data rate associated with the data file request. The queue controller 650 processes (1740*b*) the queue entry S3 at the queue location at the time unit 2 during the scheduling queue 1500*a* processing time.

In some examples, the time unit for the queue locations that are processed in different scheduling queues (e.g., 1500*a* and 1500*b*) are the same (e.g., time unit 3) but the queue locations are processed at different times since the scheduling queues are time shared by the storage module 600. For example, stream entry S4 at the queue location in scheduling queue 1500*a* is at time unit 3 and stream entry H3 at the queue location in scheduling queue 1500*b* is at time unit 3 but the stream entries S4 and H3 are processed at different times due to the time sharing between the scheduling queues. The weighted round robin time sharing sequence between the scheduling queues is illustrated in Table 5.

TABLE 5

| | Time Sharing Sequence | | |
|---|---|---|---|
| Sequence | Scheduling Queue | Queue Time Unit | Stream Entry Processed |
| 1 | Standard Definition 1500a | 3 | S4 |
| 2 | High Definition 1500b | 1 | H2 |
| 3 | High Definition 1500b | 2 | H1 |
| 4 | High Definition 1500b | 3 | H4 and H3 |
| 5 | High Definition 1500b | 4 | NA |

As another example, Betty Smith utilizes her STB to request the Super Lizard movie in high definition. The data request is transmitted from Ms. Smith's STB to the storage system 300. The storage system 300 transmits the data request to the storage module 600. The storage module 600 receives (1710) the data file request for Super Lizard movie. The queue controller 650 selects (1720a) the high definition scheduling queue 1500b from a plurality of scheduling queues (in this example, 1500a and 1500b) based on the high definition data rate associated with the data file request. The queue controller 650 determines (1730a) a queue location illustrated by stream entry H3 within the high definition scheduling queue 1500b. The queue controller 650 processes (1740a) the stream entry H3 at the queue location at time unit 3 during the scheduling queue 1500b processing time.

Furthermore, based on Ms. Smith's request for the Super Lizard movie in high definition the queue controller 650 selects (1720b) the standard definition scheduling queue 1500a from the plurality of scheduling queues (in this example, 1500a and 1500b). In this example, data requests associated with a high definition data rate are assigned to the high definition scheduling queue 1500b and the standard definition scheduling queue 1500a to meet the data rate associated with high definition data requests. The queue controller 650 determines (1730b) the queue location illustrated by stream entry S3 within the standard definition scheduling queue 1500a based on the high definition data rate associated with the data file request. The queue controller 650 processes (1740b) the stream entry S3 at the queue location at the time unit 2 during the scheduling queue 1500a processing time.

The queue controller 650 can schedule the queue entries in the scheduling queues 1500a and 1500b to allow for the sequential reading of storage devices (in this example, stream entry S3 in the standard definition scheduling queue 1500a reads from storage device 1 then stream entry H3 in the high definition scheduling queue 1500b reads from storage device 2, etc.). The synchronization of the two or more scheduling queues in the storage module 600 advantageously provides for a plurality of scheduling queues while sequentially reading parts of a data file from the storage devices 610 to maximize the efficiency of the storage module 600. For example, the queue controller 650 schedules the queue entries in the scheduling queues 1500a and 1500b to read as follows: stream entry S2 in the standard definition scheduling queue 1500a reads from storage device 1 610a, stream entry H2 in the high definition scheduling queue 1500b reads from storage device 2 610b, the stream entries associated with the high definition data rate in the scheduling queues are barrel shifted twice (barrel shifting is described above), the stream entry S2 in the standard definition scheduling queue 1500a reads from storage device 3 610c, the stream entry H2 in the high definition queue 1500b reads from storage device 1 610a and so forth until the queue controller 650 removes the queue entries.

Table 6 illustrates the processing of the scheduling queue utilizing a round robin time sharing mechanism.

TABLE 6

Processing of Scheduling Queues

| Sequence | Scheduling Queue | Queue Time Unit | Stream Entry Processed |
|---|---|---|---|
| 1 | Standard Definition 1500a | 1 | S2 |
| 2 | High Definition 1500b | 1 | H2 |
| 3 | Standard Definition 1500a | 2 | S3 |
| 4 | High Definition 1500b | 2 | H1 |
| 5 | Standard Definition 1500a | 3 | S4 |
| 6 | High Definition 1500b | 3 | H4 and H3 |

TABLE 6-continued

Processing of Scheduling Queues

| Sequence | Scheduling Queue | Queue Time Unit | Stream Entry Processed |
|---|---|---|---|
| 7 | Standard Definition 1500a | 4 | S1 |
| 8 | High Definition 1500b | 4 | NA |

In some examples, the data file includes multimedia content (e.g., television program, movie program, etc.), text content (e.g., book, magazine, etc.), video content, audio content (e.g., radio program, web cast program, etc.), and/or any other type of content. In other examples, the data file includes a text file (e.g., .txt, .bat, etc.), an image file (e.g., .jpg, .gif, etc.), an audio file (e.g., .mp3, .aud, etc.), a video file (e.g., .dv, .m4v, etc.), a web file (e.g., .html, .php, etc.), an executable file, a library file, a compressed file, an encoded file, and/or any other type of file storable on a storage device. The multimedia content can include, for example, audio, video, text, an image, an animation, and/or any other type of multimedia.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method associated with storage of data, the method comprising:
   determining, at a storage module comprising two or more storage devices, a first queue location from a plurality of queue locations for the storage module based on a first data rate associated with at least a portion of a first data file stored in a first storage device of the storage module, some queue locations within the plurality of queue locations being associated with a different data rate, thereby enabling the plurality of queue locations to accommodate a plurality of data rates at the storage module;
   determining a second queue location from the plurality of queue locations based on a second data rate associated with at least a portion of a second data file stored in a second storage device of the storage module, the second data rate being different than the first data rate, wherein (a) the second queue location associated with the second storage device and the second data file and (b) the first queue location associated with the first storage device and the first data file are scheduled by the storage module for transmission during a same content read time unit;
   processing the first queue location at a first time to enable streaming of the portion of the first data file from the first storage device of the storage module at or above the first data rate; and
   processing the second queue location at a second time to enable streaming of the portion of the second data file from the second storage device of the storage module at or above the second data rate.

2. The method of claim 1, wherein the first queue location is within a first scheduling queue and the second queue location is within a second scheduling queue.

3. The method of claim 1, further comprising:
   determining the first time based on the first data rate, a start location of the first data file, or both; and
   determining the second time based on the second data rate, a start location of the second data file, or both.

4. A method associated with storage of data, the method comprising:
   receiving, at a storage module comprising two or more storage devices, a data file request from a delivery module, wherein a first storage device stores at least a portion of a first data file and a second storage device stores at least a portion of a second data file;
   selecting a first scheduling queue from a plurality of scheduling queues for the storage module based on a first data rate associated with the data file request, each of the plurality of scheduling queues being associated with a different data rate and including one or more content read time units such that each of (a) the first storage device associated with the first data file and (b) the second storage device associated with the second data file can be scheduled by the storage module for reading at a same content read time unit from the one or more content read time units; and determining a first queue location within the first scheduling queue based on the data file request.

5. The method of claim 4, further comprising:
processing the first scheduling queue at a first time; and
processing a second scheduling queue at a second time, the second scheduling queue being associated with a different data rate than the first scheduling queue.

6. The method of claim 5, wherein the first time and the second time are identical.

7. The method of claim 4, further comprising determining a time ratio for processing of the first scheduling queue and a second scheduling queue, the time ratio associated with a data rate associated with each queue.

8. The method of claim 7, further comprising:
processing the first scheduling queue at a first time; and
processing the second scheduling queue at a second time which is a function of the time ratio to the first time.

9. The method of claim 4, further comprising adding a part of a data file associated with the data file request to a data queue based on the first queue location within the first scheduling queue.

10. The method of claim 4, further comprising determining a second queue location within the first scheduling queue based on the data file request.

11. The method of claim 4, further comprising:
determining a second scheduling queue from the plurality of scheduling queues based on the data rate associated with the data file request; and
determining a second queue location within the second scheduling queue based on the data file request.

12. The method of claim 4, further comprising determining a plurality of queue locations based on the data file request, the data rate associated with the data file request, or both.

13. The method of claim 12, wherein the plurality of queue locations are within the first scheduling queue.

14. The method of claim 12, wherein the plurality of queue locations are within the first scheduling queue and a second scheduling queue.

15. The method of claim 4, further comprising removing the first queue location within the first scheduling queue based on a file request update.

16. The method of claim 4, wherein the first data rate associated with the data file request comprises a transmission rate of multimedia segments which thereby enables displaying of multimedia content associated with the multimedia segments.

17. A computer program product, tangibly embodied in a non-transitory computer readable medium, the computer program product including instructions being operable to cause a data processing apparatus to:
determine, at a storage module comprising two or more storage devices, a first queue location from a plurality of queue locations for the storage module based on a first data rate associated with at least a portion of a first data file stored in a first data storage device of the storage module, some queue locations within the plurality of queue locations being associated with a different data rate, thereby enabling the plurality of queue locations to accommodate a plurality of data rates at the storage module;

determine a second queue location from the plurality of queue locations based on a second data rate associated with at least a portion of a second data file stored in a second data storage device of the storage module, the second data rate being different than the first data rate, wherein (a) the second queue location associated with the second storage device and the second data file and (b) the first queue location associated with the first storage device and the first data file are scheduled for transmission by the storage module during a same content read time unit;

process the first queue location at a first time to enable streaming of the portion of the first data file from the first storage device of the storage module at or above the first data rate; and process the second queue location at a second time to enable streaming of the portion of the second data file from the second storage device of the storage module at or above the second data rate.

18. A system associated with storage of data, the system comprising:
a storage module comprising:
a plurality of storage devices, each storage device configured to store a part of a data file, wherein a first storage device stores at least a portion of a first data file and a second storage device stores at least a portion of a second data file; and
a storage controller module connected to each of the plurality of storage devices independently and configured to:
receive a data file request from a delivery module,
determine a first scheduling queue from a plurality of scheduling queues for the storage module based on a data rate associated with the data file request, each of the plurality of scheduling queues being associated with a different data rate and including one or more content read time units such that each of (a) the first storage device associated with the first data file and (b) the second storage device associated with the second data file can be scheduled by the storage module for reading at a same content read time unit from the one or more content read time units, and
determine a first queue location within the first scheduling queue based on the data file request.

19. A system associated with independent storage of data, the system comprising:
a means for storage of data comprising:
a plurality of means for storing data, each means for storing data stores a part of a data file wherein a first means for storing data stores at least a portion of a first data file and a second means for storing data stores at least a portion of a second data file; and
a means connected to each of the plurality of means for storing data independently and comprising:
a means for receiving a data file request from a delivery module,
a means for determining a first scheduling queue from a plurality of scheduling queues for the means for storage of data based on a data rate associated with the data file request, each of the plurality of scheduling queues being associated with a different data rate and including one or more content read time units such that each of (a) the first means for storing data associated with the first data file and (b) the second means for storing data associated with the second data file can be scheduled by the system for reading at a same content read time unit from the one or more content read time units, and a means for determining a first queue location within the first scheduling queue based on the data file request.

20. The computer program product of claim 17, wherein the first queue location is within a first scheduling queue and the second queue location is within a second scheduling queue.

* * * * *